United States Patent
Kanda et al.

(10) Patent No.: US 7,689,319 B2
(45) Date of Patent: Mar. 30, 2010

(54) COMMUNICATION ROBOT CONTROL SYSTEM

(75) Inventors: Takayuki Kanda, Kyoto (JP); Hiroshi Ishiguro, Kyoto (JP); Takahiro Miyashita, Kyoto (JP); Kiyoshi Kogure, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 1090 days.

(21) Appl. No.: 10/567,312

(22) PCT Filed: Aug. 12, 2004

(86) PCT No.: PCT/JP2004/011874
§ 371 (c)(1),
(2), (4) Date: Feb. 3, 2006

(87) PCT Pub. No.: WO2005/014242
PCT Pub. Date: Feb. 17, 2005

(65) Prior Publication Data
US 2006/0293787 A1    Dec. 28, 2006

(30) Foreign Application Priority Data
Aug. 12, 2003   (JP) .............................. 2003-291939

(51) Int. Cl.
*G06F 19/00* (2006.01)
(52) U.S. Cl. .................................................. 700/245
(58) Field of Classification Search ................. 700/245, 700/257–259
See application file for complete search history.

(56) References Cited

U.S. PATENT DOCUMENTS

| | | | | |
|---|---|---|---|---|
| 2002/0137425 A1* | 9/2002 | Furumura | ..................... | 446/175 |
| 2002/0156751 A1* | 10/2002 | Takagi et al. | ................... | 706/12 |
| 2003/0014159 A1* | 1/2003 | Inoue et al. | .................. | 700/245 |

FOREIGN PATENT DOCUMENTS

| | | | | |
|---|---|---|---|---|
| JP | 2001-162573 | 6/2001 | ..................... | 13/0 |
| JP | 2001-191280 | 7/2001 | | |
| JP | 2001-277163 | 10/2001 | ..................... | 9/22 |
| JP | 2001-353678 | 12/2001 | | |
| JP | 2002-103258 | 4/2002 | | |
| JP | 2002-120174 | 4/2002 | ..................... | 9/16 |
| JP | 2002-137182 | 5/2002 | ..................... | 13/8 |
| JP | 2002-273674 | 9/2002 | ..................... | 9/16 |
| JP | 2003-191187 | 7/2003 | | |

* cited by examiner

Primary Examiner—Kim T Nguyen
(74) Attorney, Agent, or Firm—Gerald T. Bodner

(57) ABSTRACT

A communication robot control system displays a selection input screen for supporting input of actions of a communication robot. The selection input screen displays in a user-selectable manner a list of a plurality of behaviors including not only spontaneous actions but also reactive motions (reflex behaviors) in response to behavior of a person as a communication partner, and a list of emotional expressions to be added to the behaviors. According to a user's operation, the behavior and the emotional expression to be performed by the communication robot are selected and decided. Then, reproductive motion information for interactive actions including reactive motions and emotional interactive actions, is generated based on input history of the behavior and the emotional expression.

16 Claims, 16 Drawing Sheets

FIG. 6

| IDENTIFIER | REGION | BEHAVIOR | ATTRIBUTE |
|---|---|---|---|
| 1 | RIGHT ARM | WAVING A HAND (GREETING) | SPONTANEOUS BEHAVIOR |
| 2 | | SWINGING THE ARMS AS IF MAKING A MARCH | SPONTANEOUS BEHAVIOR |
| ⋮ | | ⋮ | ⋮ |
| ... | | * DIRECT INPUT | SPONTANEOUS BEHAVIOR |
| ... | | (NO BEHAVIOR) | — |
| ... | LEFT ARM | WAVING A HAND (GREETING) | SPONTANEOUS BEHAVIOR |
| ... | | SWINGING ARMS AS IF MAKING A MARCH | SPONTANEOUS BEHAVIOR |
| ⋮ | | ⋮ | ⋮ |
| ... | | * DIRECT INPUT | SPONTANEOUS BEHAVIOR |
| ... | | (NO BEHAVIOR) | — |
| ... | HEAD | LOOKING TOWARD A PERSON'S FACE (EYE CONTACT) | REFLEX BEHAVIOR |
| ... | | LOOKING AT THE TOUCHED PART | REFLEX BEHAVIOR |
| ... | | LOOKING AROUND | SPONTANEOUS BEHAVIOR |
| ... | | MAKING A BOW | SPONTANEOUS BEHAVIOR |
| ... | | LOOKING STRAIGHT AHEAD | SPONTANEOUS BEHAVIOR |
| ⋮ | | ⋮ | ⋮ |
| ... | | * DIRECT INPUT | SPONTANEOUS BEHAVIOR |
| ... | | (NO BEHAVIOR) | — |
| ... | UTTERANCE | SAYING "GET OUT OF THE WAY, PLEASE" WHEN A PERSON COMES IN FRONT | REFLEX BEHAVIOR |
| ... | | SAYING "HELLO" | SPONTANEOUS BEHAVIOR |
| ... | | SAYING "BYE-BYE" | SPONTANEOUS BEHAVIOR |
| ⋮ | | ⋮ | ⋮ |
| ... | | (NO BEHAVIOR) | — |

FIG. 9

REPRODUCTIVE MOTION DB    102

| |
|---|
| REPRODUCTIVE MOTION 1<br>(BEHAVIOR OF GOING UP ON STAGE FROM THE AUDIENCE AND SAYING "HELLO")<br><br>· MOVING ALONG THE AISLE THROUGH THE DOOR<br>    →REFLEX BEHAVIOR: SAYING "GET OUT OF THE WAY, PLEASE" WHEN<br>                  A PERSON COMES IN FRONT<br>  SWING THE ARMS AS IF MAKING A MARCH<br>    →REFLEX BEHAVIOR: WHEN TOUCHED BY SOMEONE, LOOKING AT THE<br>                  TOUCHED PART<br>  LOOKING AROUND<br>    →REFLEX BEHAVIOR: LOOKING TOWARD A PERSON'S FACE, IF ANY.<br><br>· (AFTER REACHING THE STAGE) GIVING A GREETING<br>  SAYING "HELLO"<br>  MAKING A GESTURE OF BOWING<br>· FAREWELL<br>  SAYING "BYE-BYE"<br>  WAVING A HAND (GREETING)<br><br>· MOVING ALONG THE AISLE FROM THE STAGE<br>    →REFLEX BEHAVIOR: SAYING "GET OUT OF THE WAY, PLEASE" WHEN<br>                  A PERSON COMES IN FRONT<br>  SWING THE ARMS AS IF MAKING A MARCH<br>    →REFLEX BEHAVIOR: WHEN TOUCHED BY SOMEONE, LOOKING AT THE<br>                  TOUCHED PART<br>  LOOKING STRAIGHT AT THE EXIT<br>    →REFLEX BEHAVIOR: LOOKING TOWARD A PERSON'S FACE, IF ANY.<br>· REACHING THE POSITION OF THE EXIT<br>END |
| REPRODUCTIVE MOTION 2 |
| ⋮ |

| IDENTIFIER | EMOTIONAL EXPRESSION |
|---|---|
| YO | DELIGHT |
| ... | SADNESS |
| ... | ANGER |
| ⋮ | ⋮ |
| ... | NO EMOTIONAL EXPRESSION |

FIG. 14

| IDENTIFIER | REGION | BEHAVIOR | ATTRIBUTE | PROHIBITED EMOTION |
|---|---|---|---|---|
| RNA | RIGHT ARM | CRYING | SPONTANEOUS BEHAVIOR | DELIGHT |
| RGA | | MAKING A VICTORY POSE | SPONTANEOUS BEHAVIOR | SADNESS, ANGER |
| ... | | WALKING WITH SWING OF THE ARMS | SPONTANEOUS BEHAVIOR | N/A |
| ... | | SHAKING HANDS | SPONTANEOUS BEHAVIOR | N/A |
| ⋮ | | ⋮ | ⋮ | ⋮ |
| ... | LEFT ARM | CRYING | SPONTANEOUS BEHAVIOR | DELIGHT |
| ... | | MAKING A VICTORY POSE | SPONTANEOUS BEHAVIOR | SADNESS, ANGER |
| ... | | WALKING WITH SWING OF THE ARMS | SPONTANEOUS BEHAVIOR | N/A |
| ⋮ | | ⋮ | ⋮ | ⋮ |
| ... | HEAD | GIVING A GREETING | SPONTANEOUS BEHAVIOR | N/A |
| ⋮ | | ⋮ | ⋮ | ⋮ |
| ... | UTTER-ANCE | AGREEING | REFLEX BEHAVIOR | N/A |
| ⋮ | | ⋮ | ⋮ | ⋮ |

FIG. 15

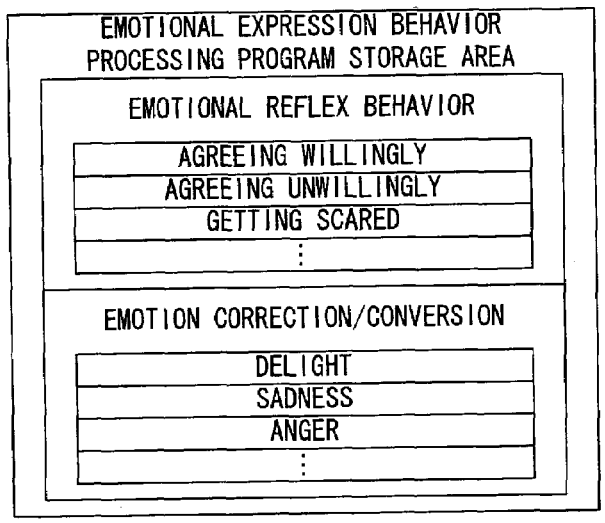

FIG. 16

| IDENTIFIER | EMOTIONAL REFLEX BEHAVIOR | REFLEX BEHAVIOR | EMOTIONAL EXPRESSION |
|---|---|---|---|
| YD | AGREEING WILLINGLY | AGREEING | DELIGHT |
| ⋮ | ⋮ | ⋮ | ⋮ |

FIG. 18

REPRODUCTIVE MOTION DB    102

REPRODUCTIVE MOTION N
(BEHAVIOR OF GIVING A GREETING AND SHAKING HANDS)

· GIVING A GREETING (SAYING "HELLO" AND MAKING A BOW)
  EMOTIONAL EXPRESSION: NOTHING
  →REFLEX BEHAVIOR: EYE CONTACT
     EMOTIONAL EXPRESSION: NOTHING

· SHAKING HANDS (SAYING "LET'S SHAKE HANDS" AND OFFERING THE HAND)
  EMOTIONAL EXPRESSION: DELIGHT
  →REFLEX BEHAVIOR: AGREEING
     EMOTIONAL EXPRESSION: DELIGHT

END

FIG. 19

CONTROL SYSTEM (AT TIME OF REPRODUCTION)

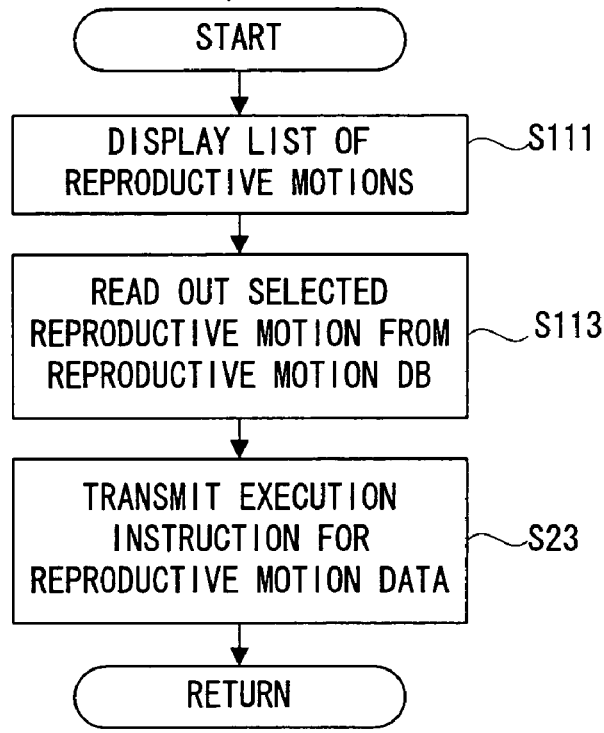

START
↓
DISPLAY LIST OF REPRODUCTIVE MOTIONS — S111
↓
READ OUT SELECTED REPRODUCTIVE MOTION FROM REPRODUCTIVE MOTION DB — S113
↓
TRANSMIT EXECUTION INSTRUCTION FOR REPRODUCTIVE MOTION DATA — S23
↓
RETURN

COMMUNICATION ROBOT CONTROL SYSTEM

TECHNICAL FIELD

The present invention relates to a control system for communication robot, an action input support program, a storage medium storing a program, and an action input support method. More specifically, the present invention relates to a control system for communication robot, an action input support program, a storage medium storing a program, and an action input support method, which support input of an action of a communication robot communicating with a person by voice and gesture.

PRIOR ART

In the conventional robot control technologies, generally speaking, there exist some systems which receive input for performing a mere fixed motion and reproduce the input so as to make a robot reenact the fixed motion, some teaching techniques by a teaching playback method which are very frequently used in industrial manipulators, and so on.

Meanwhile, communication robots intended to communicate with a person by voice and gesture, are required to perform not only fixed spontaneous motions for carrying out communications but also reactive motions in response to behavior of a person as a communication partner in order to realize more natural communications. In addition, a person has emotions and may exhibit the same action in a different manner depending on his emotions. Thus the communication robots are also needed to make emotional motions. However, the prior arts accept only input of fixed spontaneous motions, and there exists no system which supports input of actions to be performed by a robot including reactive motions according to behavior of a person and emotional motions.

SUMMARY OF THE INVENTION

Therefore, it is a primary object of the present invention to provide a novel control system for communication robot, an action input support program, a storage medium storing a program, and an action input support method.

It is another object of the present invention to provide a control system for communication robot, an action input support program, a storage medium storing a program, and an action input support method, which makes it possible to easily input and generate interactive actions including reactive motions.

It is still another object of the present invention to provide a control system for communication robot, an action input support program, a storage medium storing a program, and an action input support method, which makes it possible to easily input and generate interactive actions including emotional motions.

A control system for communication robot according to the present invention of claim 1 supports input of interactive actions to be performed by a communication robot, and comprises a storage means for storing information on a plurality of behaviors including a reflex behavior to be performed in response to behavior of a person and a spontaneous behavior to be performed in a spontaneous manner, a display means for displaying a list of the plurality of behaviors in a user-selectable manner based on the information stored in the storage means, a behavior decision means for deciding a behavior to be performed by the communication robot from the list of behaviors displayed by the display means according to a user's operation, and a generation means for generating reproductive motion information for interactive actions to be performed by the communication robot, based on a history of the behavior decided by the behavior decision means.

In the present invention of claim 1, the information on the plurality of behaviors including a reflex behavior (reactive motion) responsive to behavior of a person as a communication partner as well as a spontaneous behavior, is pre-stored in the storage means. Based on the information on the plurality of behaviors prepared in advance, the display means displays the list of the plurality of behaviors in a user-selectable manner. That is, this list presents the reflex behavior as well in a user-selectable manner. The user can select from the displayed list of behaviors a behavior to be performed by the communication robot. The behavior decision means decides a behavior to be performed by the communication robot from the list of behaviors according to the user's operation. Also, the generation means generates the reproductive motion information for interactive actions to be performed by the communication robot, based on the historical record of the decided behavior. Therefore, according to the present invention of claim 1, by selecting a behavior to be performed by the communication robot from the list of behaviors including the reflex behavior, the user can easily input each of behaviors forming interactive actions and generate the reproductive motion information of the interactive actions including the reflex behavior.

A control system for communication robot according to the present invention of claim 2, depends on the present invention of claim 1. The display means further displays a list of a plurality of emotional expressions in a user-selectable manner. The behavior decision means further decides an emotional expression which is to be added to the behavior to be performed by the communication robot, from the list of emotional expressions according to the user's operation. The generation means generates reproductive motion information based on the historical records of the behavior and emotional expression decided by the behavior decision means.

In the present invention of claim 2, the list of plurality of emotional expressions is further displayed by the display means as well as the list of behaviors. From the plurality of emotional expressions, the user can select an emotional expression desired to be added to the behavior. The behavior decision means decides the behavior to be performed by the communication robot and further the emotional expression to be added to the behavior according to the user's operation. The generation means generates the reproductive motion information based on the historical records of the decided behavior and emotional expression. Thus, according to the present invention of claim 2, it is possible to easily input the emotional behavior, and easily input and generate the reproductive motion information of the emotional interactive actions.

A control system for communication robot according to the present invention of claim 3, depends on the present invention of claim 2. The behavior decision means further includes a determination means for determining whether or not the emotional expression selected by the user is appropriate to the selected behavior, and does not permit the emotional expression to be added to the behavior if the determination means determines that the emotional expression is not appropriate to the behavior.

In the present invention of claim 3, the determination means determines whether or not the emotional expression selected by the user is appropriate to the selected behavior. The emotional expression is added to the behavior in accordance with the determination result. That is, if it is determined that the emotional expression is inappropriate to the behavior, the addition of the emotional expression to the behavior is not permitted. Consequently, according to the present invention of claim 3, it is possible to prevent a contradiction between a behavior as an emotional expression and an additional emotional expression.

A control system for communication robot according to the present invention of claim 4, depends on any one of the present inventions of claims 1 to 3 and further comprises a transmission means for, when the behavior decision means has decided the behavior to be performed by the communication robot, transmitting an execution instruction for the behavior to the communication robot.

In the present invention of claim 4, the transmission means transmits the execution instruction for the decided behavior to the communication robot. According to the execution instruction, the communication robot performs the decided behavior. Therefore, the user can check the actual motion of the communication robot and thus easily produce the interactive actions.

A control system for communication robot according to the present invention of claim 5, depends on any one of the present inventions of claims 1 to 4. The display means displays the list of behaviors classified by region of the communication robot.

In the present invention of claim 5, the list of behaviors classified by region is displayed, which makes it possible to present the plurality of behaviors to the user in an easy-to-understand manner. Thus, the user can easily input a desired behavior.

A control system for communication robot according to the present invention of claim 6, depends on any one of claims 1 to 5. When the behavior is selected from the list of behaviors by the user's operation, the display means displays an image of an appearance of the communication robot performing the behavior.

In the present invention of claim 6, when the user selects the behavior from the list, the appearance of the communication robot performing the behavior, is displayed as an image. Thus, the user can see in advance what motion the communication robot will actually make according to the behavior to be decided. This makes it easier to produce interactive actions.

An action input support program according to the present invention of claim 7, is an action input support program for supporting input of interactive actions to be performed by a communication robot, on a control system for communication robot comprising a storage means for storing information on a plurality of behaviors including a reflex behavior to be performed in response to behavior of a person and a spontaneous behavior to be performed in a spontaneous manner by the communication robot. This program causes a processor of the control system for communication robot to execute a display step of displaying a list of the plurality of behaviors in a user-selectable manner based on the information stored in the storage means, a behavior decision step of deciding a behavior to be performed by the communication robot from the list of behaviors displayed by the display step according to the user's operation, and a generation step of generating reproductive motion information for interactive actions to be performed by the communication robot, based on a history of the behavior decided by the behavior decision step.

An action input support program according to the present invention of claim 8 depends on the present invention of claim 7. The display step further displays a list of a plurality of emotional expressions in a user-selectable manner. The behavior decision step further decides an emotional expression which is to be added to the behavior to be performed by the communication robot, from the list of emotional expressions according to the user's operation. The generation step generates reproductive motion information based on the history of the behavior and emotional expression decided by the behavior decision step.

An action input support program according to the present invention of claim 9, depends on the present invention of claim 8. The behavior decision step further includes a determination step of determining whether or not the emotional expression selected by the user is appropriate to the selected behavior, and does not permit the emotional expression to be added to the behavior if the determination step determines that the emotional expression is not appropriate to the behavior.

A storage medium storing a program according to the present invention of claim 10, is a storage medium storing a program for supporting input of interactive actions to be performed by a communication robot, on a control system for communication robot comprising a storage means for storing information on a plurality of behaviors including a reflex behavior to be performed in response to behavior of a person and a spontaneous behavior to be performed in a spontaneous manner by the communication robot. The program causes a processor of the control system for communication robot to execute a display step of displaying a list of the plurality of behaviors in a user-selectable manner based on the information stored in the storage means, a behavior decision step of deciding a behavior to be performed by the communication robot from the list of behaviors displayed by the display step according to the user's operation, and a generation step of generating reproductive motion information for the interactive actions to be performed by the communication robot, based on a history of the behavior decided by the behavior decision step.

A storage medium storing a program according to the present invention of claim 11 depends on the present invention of claim 10. The display step further displays a list of a plurality of emotional expressions in a user-selectable manner. The behavior decision step further decides from the list of emotional expressions an emotional expression which is to be added to the behavior to be performed by the communication robot, according to the user's operation. The generation step generates reproductive motion information based on the history of the behavior and emotional expression decided by the behavior decision step.

A storage medium storing a program according to the present invention of claim 12, depends on the present invention of claim 11. The behavior decision step further includes a determination step of determining whether or not the emotional expression selected by the user is appropriate to the selected behavior, and does not permit the emotional expression to be added to the behavior if the determination step determines that the emotional expression is not appropriate to the behavior.

An action input support method according to the present invention of claim 13, is an action input support method for supporting input of interactive actions to be performed by a communication robot, on a control system for communication robot comprising a storage means for storing information on a plurality of behaviors including a reflex behavior to be performed in response to behavior of a person and a spontaneous behavior to be performed in a spontaneous manner by the communication robot. This method includes a display step of displaying a list of the plurality of behaviors in a user-selectable manner based on the information stored in the storage means, a behavior decision step of deciding a behavior to be performed by the communication robot from the list of behaviors displayed by the display step according to a user's operation, and a generation step of generating reproductive motion information for interactive actions to be performed by the communication robot, based on a history of the behavior decided by the behavior decision step.

An action input support method according to the present invention of claim 14 depends on the present invention of claim 13. The display step further displays a list of a plurality of emotional expressions in a user-selectable manner. The behavior decision step further decides an emotional expression which is to be added to the behavior to be performed by the communication robot, from the list of emotional expressions according to the user's operation. The generation step generates reproductive motion information based on the history of the behavior and emotional expression decided by the behavior decision step.

An action input support method according to the present invention of claim 15, depends on the present invention of claim 14. The behavior decision step further includes a determination step of determining whether or not the emotional expression selected by the user is appropriate to the selected behavior. If the determination step determines that the emotional expression is not appropriate to the behavior, the addition of the emotional expression to the behavior is not permitted.

The present invention of claims 7 to 9, the present invention of claim 10 to 12, or the present invention of 13 to 15 makes it possible to easily input and generate the reproductive motion information of interactive actions including a reflex behavior, as in case of the above described present invention of claims 1 to 3. In addition, it is possible to easily input and generate the reproductive motion information of emotional interactive actions, and prevent the addition of an emotional expression inconsistent with the behavior.

According to the present invention, the list of the plurality of behaviors including the reflex behavior in response to behavior of a person is displayed so as to allow the user to make a selection, and thus it is possible to easily input and generate interactive actions to be performed by the communication robot. Since the generated interactive actions include not only a spontaneous behavior but a reflex behavior as well, it is possible to initiate the reflex behavior according to behavior of a communication partner.

Consequently, this makes it easy to make the communication robot realize more natural, diverse interactive actions.

Moreover, in case where the list of the emotional expressions to be added to the behaviors is further displayed together with the list of the behaviors for the user to make a selection, it is possible to easily input an emotional motion and also easily input and generate emotional interactive actions. Accordingly, it is possible to cause the communication robot to realize with ease more diverse interactive actions including emotional reactive motions and emotional spontaneous behaviors.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view showing one example of contents of behavior list table data stored in a memory of the control system for communication robot in FIG. 1 embodiment;

FIG. 9 is an illustrative view showing one example of reproductive motion data stored in a reproductive motion DB of the control system for communication robot in FIG. 1 embodiment;

FIG. 14 is an illustrative view showing one example of contents of behavior list table data stored in the memory of the control system for communication robot in FIG. 12 embodiment;

FIG. 15 is an illustrative view showing one example of contents of an emotional expression action DB provided in the control system for communication robot in FIG. 12 embodiment;

FIG. 16 is an illustrative view showing one example of contents of emotional reflex behavior list data stored in the memory of the control system for communication robot in FIG. 12 embodiment;

FIG. 18 is an illustrative view showing one example of reproductive motion data stored in the reproductive motion DB of the control system for communication robot in FIG. 12 embodiment;

FIG. 19 is a flowchart showing one example of an operation at a time of reproduction of the control system for communication robot in FIG. 12 embodiment;

BEST MODE FOR PRACTICING THE INVENTION

Figure 1:
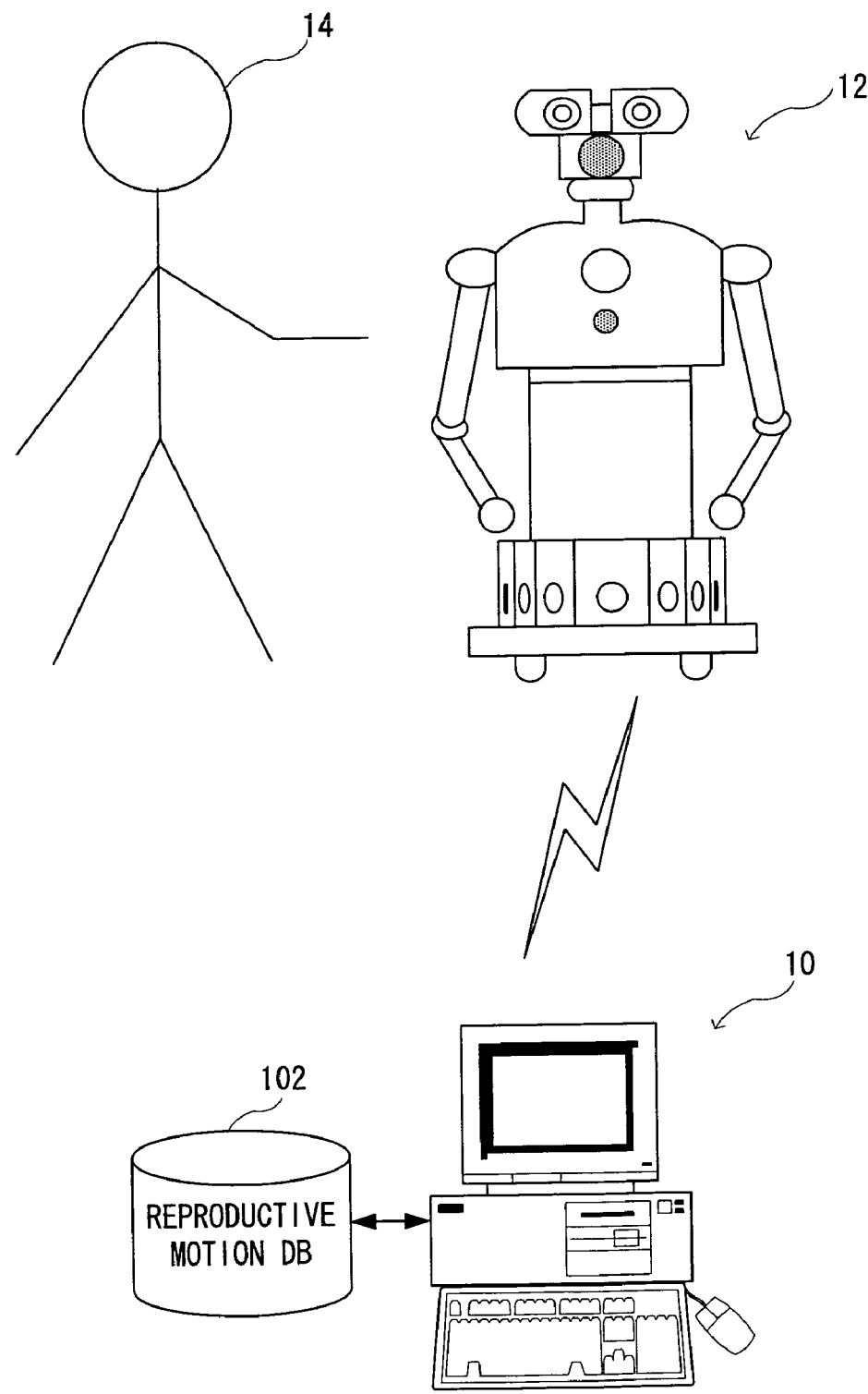
FIG. 1 is an illustrative view showing an outline of a control system for communication robot in one embodiment of the present invention.

Referring to FIG. 1, a control system for communication robot (hereinafter also referred to as just "system") 10 of this embodiment is for supporting input of interactive actions to be performed by a communication robot (hereinafter also referred to as just "robot") 12. The communication robot 12 is a robot intended for communications with a person 14 by voice and gesture.

Figure 2:
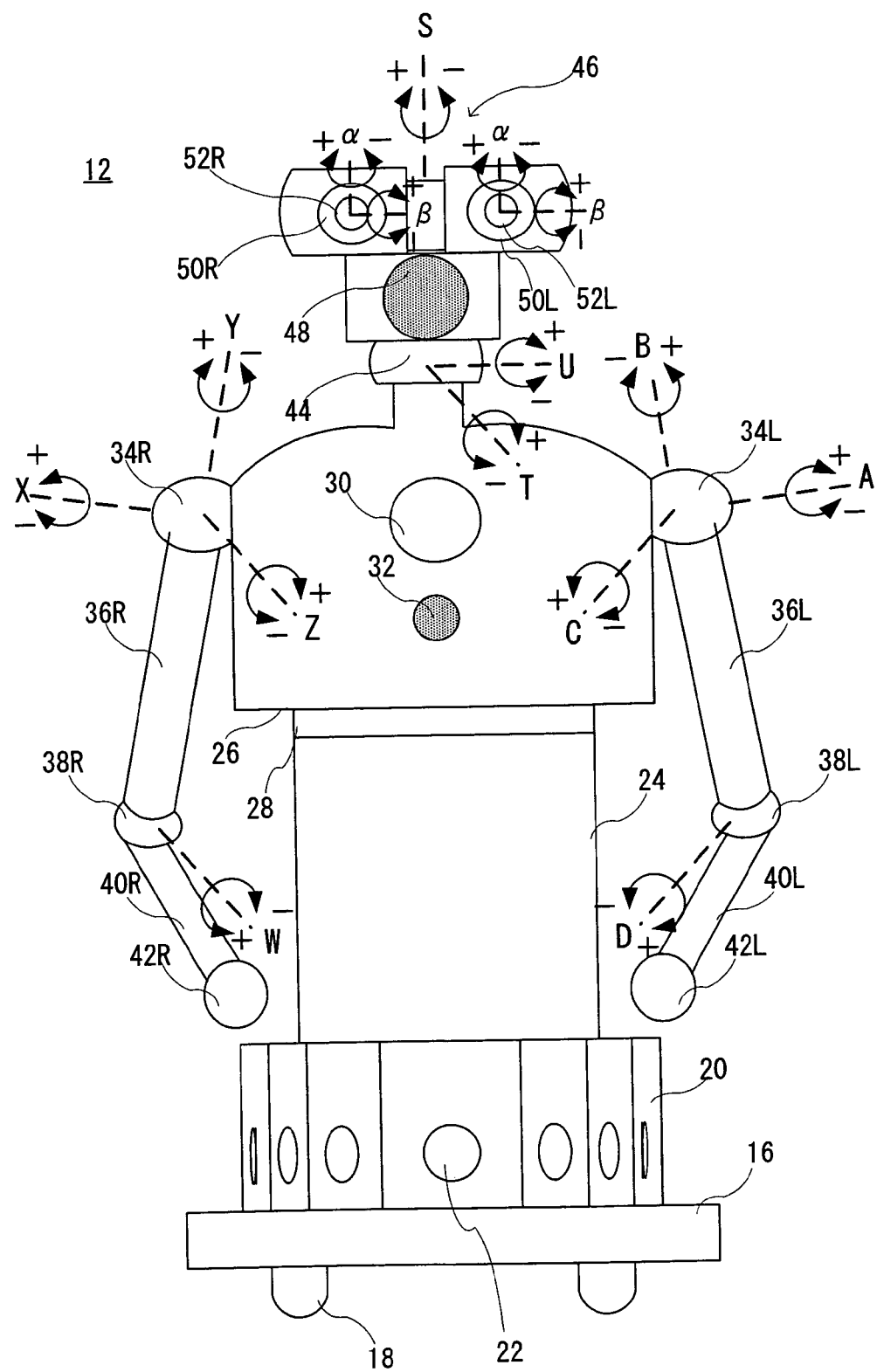
FIG. 2 is an illustrative view showing an outer appearance of the communication robot in FIG. 1.
Figure 3:
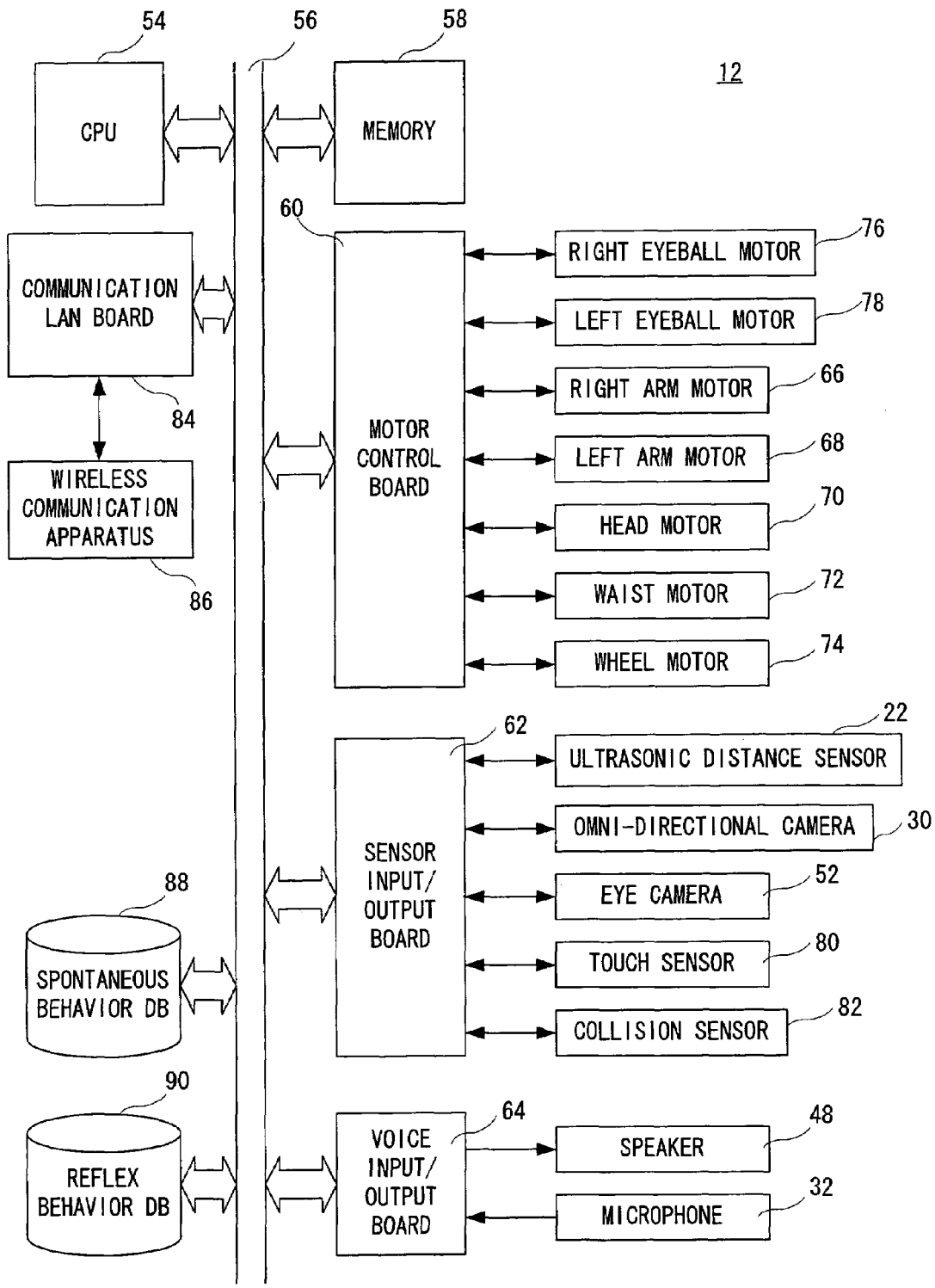
FIG. 3 is a block diagram showing an internal structure of the communication robot in FIG. 1.

Here, the robot 12 applied to this embodiment will be described in detail. Referring to FIG. 2, the robot 12 includes a truck 16. Provided on a lower surface of the truck 16 is a wheel 18 for making the robot 12 move autonomously. The wheel 18 is driven by a wheel motor (indicated by a reference numeral "74" in FIG. 3 showing an internal structure of the robot 12), and is capable of moving the truck 16, i.e., the robot 12 in an arbitrary direction of forward, backward, leftward, or rightward. Additionally, although not illustrated, the truck 16 has a collision sensor (indicated by a reference numeral "82" in FIG. 3) attached to its front surface. The collision sensor detects contact of the truck 16 with a person or another obstacle. Then, if any contact with an obstacle is detected during movement of the robot 12, the driving of the wheel 18 is promptly halted to bring the robot 12 into a sudden stop.

Moreover, a height of the robot 12 is supposed to be about 100 cm in this embodiment not so as to give a coercive impression to persons, particularly children. However, the height can be arbitrarily changed.

Provided on the truck 16 is a sensor attachment panel 20 of polygonal column. Each surface of the sensor-mount panel 20 is attached with an ultrasonic distance sensor 22. The ultrasonic distance sensor 22 measures a distance from mainly a person in a circumference of the attachment panel 20, i.e., the robot 12.

Further provided on the truck 16 is a body of the robot 12 whose lower part is surrounded by the above stated attachment panel 20, in such a manner as to stand upright. The body is composed of a lower body 24 and an upper body 26. These lower body 24 and upper body 26 are coupled to each other by a joint portion 28. Besides, although not illustrated, the joint portion 28 incorporates an elevating mechanism. By using the elevating mechanism, it is possible to change a height of the upper body 26, that is, the height of the robot 12. The elevating mechanism is driven by a waist motor (indicated by a reference numeral "72" in FIG. 3), as described later. The above mentioned height 100 cm of the robot 12 is a value with the upper body 26 in a lowest position. Therefore, the height of the robot 12 may be more than 100 cm.

Provided on an approximate center of the upper body 26 are one omni-directional camera 30 and one microphone 32. The omni-directional camera 30 photographs a circumference of the robot 12, and is distinguished from an eye camera 52 described later. The microphone 32 captures ambient sounds, in particular, persons' voices.

The upper body 26 has upper arms 36R and 36L attached on its both shoulders by shoulder joints 34R and 34L, respectively. The shoulder joints 34R and 34L each have degrees of freedom for three axes. More specifically, the shoulder joint 34R can control an angle of the upper arm 36R around each of X axis, Y axis and Z axis. The Y axis is an axis parallel to the upper 36R in a longitudinal direction (or the axis), and the X axis and the Z axis are axes orthogonal to the Y axis in different directions. The shoulder joint 34L can control an angle of the upper arm 36L around each of A axis, B axis and C axis. The B axis is an axis parallel to the upper arm 36L in a longitudinal direction (or the axis), and the A axis and the C axis are axes orthogonal to the B axis in different directions.

Front arms 40R and 40L are attached to respective ends of the upper arms 36R and 36L via elbow joints 38R and 38L. The elbow joints 38R and 38L can control angles of the front arms 40R and 40L around each of a W axis and a D axis, respectively.

In addition, "0 degree" is a home position for the X, Y, Z and W axes and the A, B, C and D axes which control displacements of the upper arms 36R, 36L and the front arms 40R, 40L. In the home position, the upper arms 36R, 36L and the front arms 40R and 40L are directed in the downward direction.

Moreover, although not shown in FIG. 2, a shoulder part of the upper body 26 including the shoulder joints 34R and 34L, the above described upper arms 36R, 36L and the front arms 40R and 40L are each provided with a touch sensor. These touch sensors detect whether or not the person 14 has touched these parts of the robot 12. These touch sensors are also collectively shown in FIG. 3 by a reference numeral 80.

Balls 42R and 42L corresponding to hands are fixedly attached to respective ends of the front arms 40R and 40L are. Also, in case where some finger functions are required unlike the case with the robot 12 of this embodiment, it may be possible to use "hands" in the shape of a human's hands instead of the balls 42R and 42L.

Furthermore, although the shape, dimensions etc. of the robot 12 are supposed to be set as appropriate, the upper body 26, for example, may include a front side, rear side, right side, left side, top side and bottom side, and the right side and left side may be formed in such a manner that their surfaces are obliquely directed forward in another embodiment. More specifically, it may be formed in such a manner that a width of the front side is shorter than that of the rear side, and an overhead view of the upper body 26 is a trapezoid in shape. In such a case, the shoulder joints 34R and 34L are attached to the right side and the left side via right and left support portions whose surfaces are parallel to the right and left sides, respectively. Also, rotation ranges of the upper arm 36R and the upper arm 36L are restricted by the right and left sides or surfaces (attachment surfaces) of the support portions, and thus the upper arms 36R and 36L will never rotate beyond the attachment surfaces. However, by appropriately setting tilt angles of the right and left sides, a distance between the B axis and the Y axis, lengths of the upper arms 36R and 36L, lengths of the front arms 40R and 40L etc., the upper arms 36R and 36L can rotate more inwards beyond the front. Accordingly, the arms of the robot 12 can be crossed at the front even if there is no degree of freedom in the arms due to the W axis and D axis. It is consequently possible to establish close communications with a person positioned in front such as giving a hug each other even with few degrees of freedom of the arm.

A head 46 is attached to a top center of the upper body 26 via a neck joint 44. The neck joint 44 has 3 degrees of freedom and can be controlled in angle around each of an S axis, a T axis and a U axis. The S axis is an axis extending upward directly from the neck, and the T axis and U axis are axes orthogonal to the S axis in different directions. The head 46 is provided with a speaker 48 in a position corresponding to a human's mouth. The speaker 48 is used by the robot 12 to communicate by sound or voice with a person around the same. Alternatively, the speaker 48 may be provided to another part of the robot 12, for example, the body.

Also, the head 46 is provided with eyeballs 50R and 50L in positions corresponding to eyes. The eyeballs 50R and 50L include eye cameras 52R and 52L, respectively. Additionally, in some cases, the right eyeball 50R and the left eyeball 50L are collectively called as an eyeball portion 50, and the right eye camera 52R and the left eye camera 52L are collectively referred to as an eye camera 52. The eye camera 52 photographs a face or another part of a person or another object which comes close to the robot 12, and fetches an image signal of the same.

Moreover, either of the above described omni-directional camera 30 and the eye camera 52 may be a camera using a solid-state imaging device such as a CCD and a CMOS.

For example, the eye camera 52 is fixed within the eyeball 50, and the eyeball 50 is attached in a prescribed position within the head 46 via an eye ball support (not illustrated). The eyeball support has 2 degrees of freedom and can be controlled in angle around each of an α axis and a β axis. The α axis and β axis are axes set with respect to the head 46. The α axis is an axis extending upward from the head 46, and the β axis is an axis orthogonal to the α axis and also orthogonal to a direction in which a front side (face) of the head 46 points. In this embodiment, when the head 46 is in the home position, the a axis is set so as to be parallel to the S axis and the β axis is set so as to be parallel to the U axis. In the head 46 like this, the eyeball support are rotated around each of the α axis and the β axis and thus a tip end (front) side of the eyeball 50 or eye camera 52 is displaced, which moves a camera axis, i.e., a direction of gaze.

Additionally, "0 degree" is a home position for the α axis and β axis which control displacement of the eye camera 52. In this home position, the camera axis of the eye camera 52 is pointed in a direction in which the front side (face) of the head 46 points, and the gaze is in a normal vision state, as shown in FIG. 2.

FIG. 3 shows a block diagram depicting an internal structure of the robot 12. As described in FIG. 3, the robot 12 includes a microcomputer or a CPU 54 for entire control. The CPU 54 is connected through a bus 56 with a memory 58, a motor control board 60, a sensor input/output board 62 and a voice input/output board 64.

The memory 58 includes a ROM, an HDD and a RAM, although not illustrated. Previously written into the ROM and the HDD are programs for entire control of the robot 12 and various data such as voice data for utterance. The RAM is used as a temporary storage memory and also utilized as a working memory.

The motor control board 60 is composed of a DSP (Digital Signal Processor), for example, and controls each of axis motors of arms, head, eyeballs etc. More specifically, the motor control board 60 receives control data from the CPU 54, and adjusts rotation angles of total four motors (collectively shown as "right arm motor" in FIG. 3) 66 which are composed of three motors controlling respective angles θx, θy and θz of the X, Y and Z axes of the right shoulder joint 34R, and one motor controlling angle θw of the axis W of the right elbow joint 38R. The motor control board 60 also adjusts rotation angles of total four motors (collectively shown as "left arm motor" in FIG. 3) 68 which are composed of three motors controlling respective angles θa, θb and θc of the A, B and C axes of the left shoulder joint 34L, and one motor controlling angle θd of the D axis of the left elbow joint 38L. In addition, the motor control board 60 adjusts rotation angles of three motors (collectively shown as "head motor" in FIG. 3) 70 which control respective angles θs, θt and θu of the S, T and U axes of the head 46. Moreover, the motor control board 60 controls the waist motor 72 and two motors (collectively shown as "wheel motor" in FIG. 3) 74 which drive the wheel 18. Furthermore, the motor control board 60 adjusts rotation angles of two motors (collectively shown as "right eyeball motor" in FIG. 3) 76 which control respective angles of the α axis and β axis of the right eyeball 50R, and adjusts rotation angles of two motors (collectively shown as "left eyeball motor" in FIG. 3) 78 which control respective angles of the α axis and β axis of the left eyeball 50L.

Also, the above mentioned motors of this embodiment, with the exception of the wheel motor 74, are all stepping motors or pulse motors for simplification of control, but they may be direct current motors like the wheel motor 74.

The sensor input/output board 62 is similarly composed of a DSP, and fetches signals from each sensor and camera and provides them to the CPU 54. More specifically, data on reflex time from each of the ultrasonic distance sensors 22 is input into the CPU 54 through the sensor input/output board 62. Also, a video signal from the omni-directional camera 30 is subjected as necessary to a prescribed process by the sensor input/output board 62, and then input into the CPU 54. A video signal from the eye camera 52 is supplied to the CPU 54 in a same manner. In addition, FIG. 3 shows the touch sensors, described in relation to FIG. 2, collectively as "touch sensor 80". A signal from the touch sensor 80 is supplied to the CPU 54 via the sensor input/output board 62.

The CPU 54 provides the speaker 48 with synthesized voice data via the voice input/output board 64. In response to that, the speaker 48 outputs sound or voice according to the data. Then, the CPU 54 fetches voice input from the microphone 32 via the voice input/output board 64.

A communication LAN board 84, similarly composed of a DSP, provides transmission data sent from the CPU 54 to a wireless communication apparatus 86 and causes the wireless communication apparatus 86 to transmit transmission data. Also, the communication LAN board 84 receives data via the wireless communication apparatus 86, and provides the received data to the CPU 54. In this embodiment, the robot 12 communicates with the system 10 via a wireless LAN.

Besides, the CPU 54 is connected via the bus 56 with a spontaneous behavior database (DB) 88 and a reflex behavior database (DB) 90.

Reflective behaviors here mean reactive motions in response to behavior of the person 14 as a communication partner, such as directing the face toward the communication partner during communications and, when touched on some body part by the communication partner, looking at the touched part. Such reflex motions are frequently made in communications between persons, and by making the robot 12 perform the reflex actions, it becomes possible to realize more natural, abundant communications with the person 14. Meanwhile, spontaneous behaviors mean motions with spontaneity such as giving a greeting first and looking around, and here denotes the actions other than the reflex behaviors.

Figure 4:
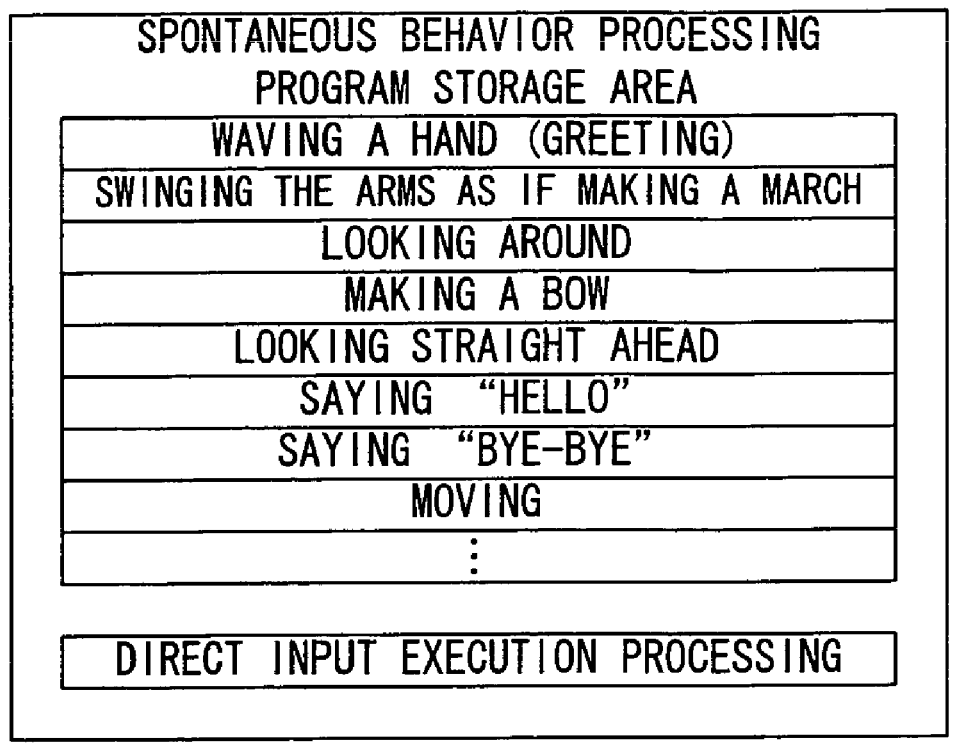
FIG. 4 is an illustrative view showing one example of contents of a spontaneous behavior DB in FIG. 3.

As shown in FIG. 4, formed in the spontaneous behavior DB 88 is a spontaneous behavior processing program storage area in which a plurality of programs for making the robot perform a spontaneous behavior are registered in advance. For example, stored are a program for a behavior of waving a hand in making a salutation, a program for a behavior of swinging arms as if making a march, a program for an action of looking around, a program for a behavior of making a bow, a program for a behavior of looking straight ahead at something, a program for a behavior of saying "Hello", a program for a behavior of saying "Bye-bye", a program for a behavior of moving to another place, etc. In addition, a direct input execution processing program is stored as well. The direct input execution processing program is intended to make the robot 12 perform motions not contained in the registered programs. When the angle of each axis is directly input by the user into the system 10 as described later, this program causes the robot 12 to perform a motion according to the input value.

Figure 5:
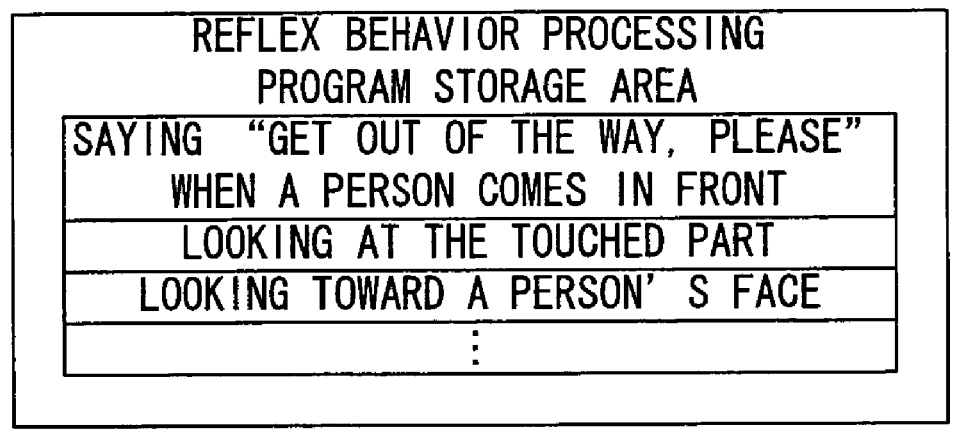
FIG. 5 is an illustrative view showing one example of contents of a reflex behavior DB in FIG. 3.

As shown in FIG. 5, formed in the reflex behavior DB 90 is a reflex behavior processing program storage area in which a plurality programs for making the robot 12 perform a reflex behavior are registered in advance. For example, stored are a program for a behavior of saying "Get out of the way, please" when a person comes in front, a program for a behavior of, when touched on the body, looking at the touched part, a program for a behavior of, when a person's face is found, directing the eyes to the person's face, etc. The reflex behaviors are reactive motions as stated above, and thus in each reflex behavior processing program, there established a precondition that a person's specific behavior is detected for execution of a reflex behavior.

The robot 12 performs interactive actions or communication actions with the person 14 by executing individual behavior programs registered in these spontaneous behavior DB 88 and reflex behavior DB 90.

The system 10 aims to support input of interactive actions to be performed by the robot 12 as described above and to which such computers as PCs and workstations are applicable. The system 10 includes a CPU, a ROM, a RAM, an HDD, input apparatuses such as a mouse and a keyboard, a display apparatus such as an LCD, a wireless communication apparatus for communicating with the robot 12, for example. The HDD stores some programs and data for support of action input, and according to the programs, the CPU executes a process while generating temporary data in the RAM. Needless to say, these programs, data and the like for support of action input may be stored into the HDD of the system 10 from various kinds of publicly known information storage media holding them.

The HDD of the system 10 also stores a behavior list table as shown in FIG. 6. Registered on this behavior list table are individual behaviors or motions which form a series of interactive actions to be performed by the robot 12. Each behavior in the behavior list table corresponds to each behavior program registered in the spontaneous behavior DB 88 and reflex behavior DB 90 of the robot 12. In the system 10, interactive actions to be performed by the robot 12 are created by selecting and specifying some behaviors in sequence from a plurality of behaviors registered in the behavior list table.

Registered in the behavior list table are, in association with an identifier of each behavior, information on region by which the behavior is performed, a text for display, and information indicating an attribute of the behavior. The region by which the behavior is performed, is divided into right hand, left hand, head, and utterance. In addition, it is assumed that utterance is one of the regions because they are here intended to classify the behaviors of the robot 12 in an easy to understand manner. The attribute of a behavior indicates whether the behavior is a spontaneous behavior or a reflex behavior. Each behavior is associated by its identifier with a program for performing each behavior registered in the spontaneous behavior DB 88 and the reflex behavior DB 90 of the robot 12.

In an example of FIG. 6, the behaviors of the right arm (the upper arm 36R and the front arm 40R), including a behavior of waving a hand in giving a greeting and a behavior of swinging arms as if making a march, are registered, and also the directly input behavior is registered as well. The directly input behavior is intended to operate a body part according to angle data on each of the axes (the X, Y, Z and W axes in case of the right hand) directly input by the user. The directly input behavior is classified as spontaneous behavior. Additionally, "no behavior" is also registered, which is to be specified in case of involving no action of the body part. The registered behaviors of the left arm (the upper arm 36L and the front arm 40L) are the same as those of the right arm. For the directly input behavior of the left arm, angle data of the A, B, C and D axes are input. Moreover, registered as the behaviors of the head 46 are reflex behaviors such as a behavior of looking at a person's face (eye contact) and a behavior of looking at the touched body part, and spontaneous behaviors such as a behavior of looking around, a behavior of making a bow and a behavior of looking straight ahead at something. As for the directly input behavior of the head, angle data of the S, T and U axes are input. Besides, registered as the utterance behaviors are reflex behaviors such as a behavior of saying "Get out of the way, please" when a person comes in front, and spontaneous behaviors such as a behavior of saying "Hello" and a behavior of saying "Bye-bye".

Figure 7:
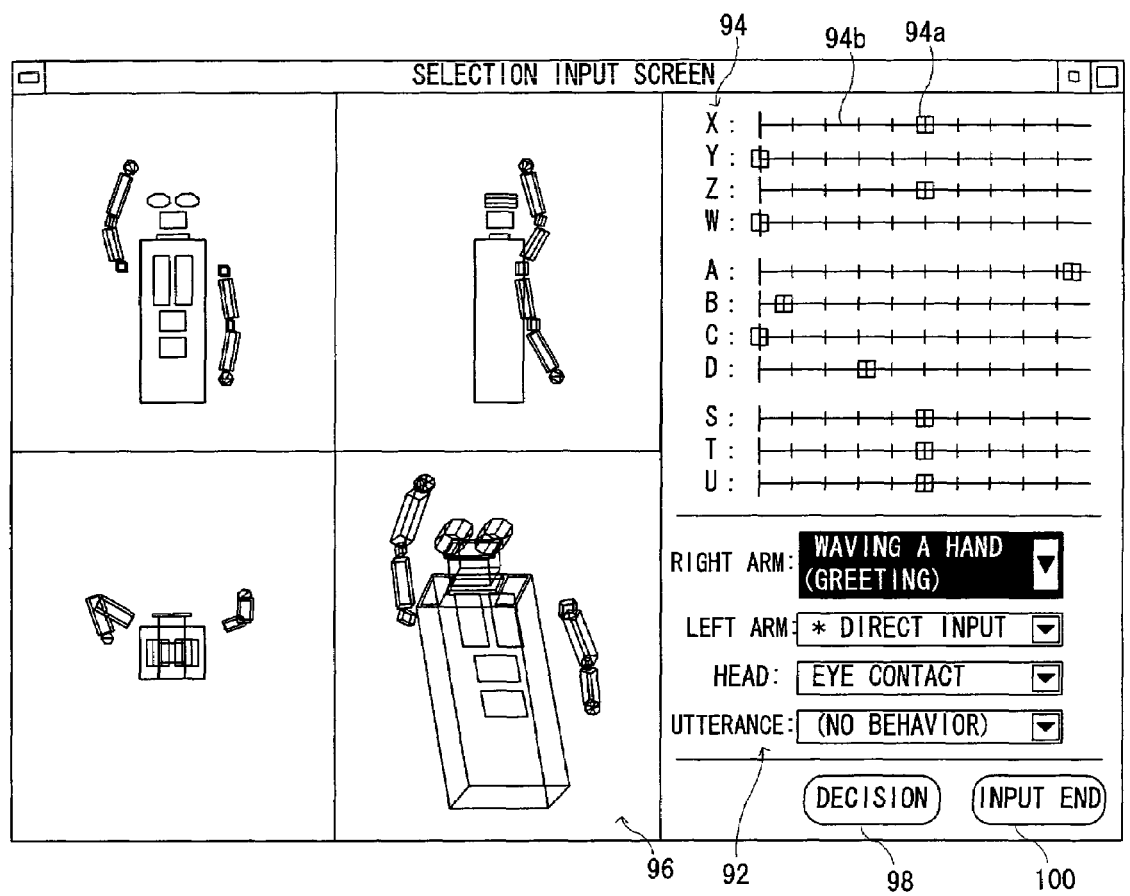
FIG. 7 is an illustrative view showing one example of a selection input screen displayed on a display apparatus of the control system for communication robot in FIG. 1 embodiment.

FIG. 7 shows one example of a selection input screen for selecting a behavior to be performed by the robot 12. The selection input screen is provided with a behavior list section 92 for displaying a registered behavior list. The behavior list section 92 provides a list box for each of the region including the right arm, left arm, head and utterance, for example. Each list box presents as option items a plurality of behaviors in text form, which are classified by region, based on the behavior list table.

In the list box, operating a button with the mouse or the like displays a plurality of behaviors for the related region, and the user thus can select one behavior from the list. More specifically, it is possible to select any of the registered spontaneous behaviors and reflex behaviors, or no behavior of the related region. It is also possible to select direct input for the right arm, left arm and head. In this manner, a plurality of behaviors are classified, listed and displayed by region, which offers the user the plurality of behaviors in an easy-to-understand manner. This allows the user to easily input a desired behavior.

Provided on an upper side of the behavior list section 92 is a direct input section 94 for inputting an angle of each axis when direct input is specified in the list box. In an example of FIG. 7, it is possible to specify the angle of each axis by moving a slider 94a along a scale 94b using a mouse or the like. In case of specifying the motion of the left arm by direct input, for example, the angle of each axis can be specified by selecting the direct input from the list box for the left arm in the behavior list section 92 and setting the sliders 94a for the A, B, C and D axes to respective appropriate positions in the direct input section 94. Additionally, the angle of each axis may be set by inputting a numerical value.

Provided on a left side of the behavior list section 92 and direct input section 94 is an image section 96 for displaying the motion of the robot 12 by images. The image section 96 displays a front view, side view, top view, perspective view of the robot 12 which is drawn as a wire-frame model, for example. When the user selects/specifies some behavior in the behavior list section 92 or specifies the angles in the direct input section 94, the robot is changed into the state of performing the motion in the image section 96. Thus, the user can see beforehand in the image section 96 what posture the robot 12 will actually take due to the selected behavior.

Also, after selecting/specifying a behavior in the behavior list section 92 or specifying the angles in the direct input section 94, the user can operate a decision button 98 from the input apparatus to decide the selected/specified behavior as a behavior to be actually performed by the robot 12. In this embodiment, an execution instruction for the selected and decided behavior is transmitted to the robot 12 and the program for the behavior is processed in the robot 12. According to that, the robot 12 actually performs the behavior. Therefore, the user can check the decided behavior not only in the image section 96 but by the real robot 12 as well.

In addition, the behavior list section 92 of FIG. 7 has an omission of a portion where a moving action is selected and set. Also, the image section 96 provides no display of the motions relating to the moving action from its nature.

The user creates interactive actions to be performed by the robot 12 by repeating the selection/specification and decision of a behavior in the selection input screen. This creation activity can be carried out while checking an image in the image section 96 of the selection input screen and actually operating the robot 12 toward the person 14 as a partner. Thus, it is possible to create the interactive actions very easily.

Besides, in the system 10, the selected and decided behavior is temporarily stored in the RAM as an input behavior history for generation of reproductive motion information. In the course of working with the selection input screen, a series of decided behaviors are stored as input history information in the RAM of the system 10. Then, operating an input end button 100 generates the reproductive motion information for reproduction of the interactive actions based on the input history. The generated reproductive motion information is saved in a reproductive motion DB 102 (FIG. 1).

Additionally, in the system 10 of this embodiment, by specifying some reproductive motion information to be carried out from the reproductive motion information registered on the reproductive motion DB 102 and instructing for its reproduction, the instruction for the execution of the reproductive motion information is transmitted to the robot 12. In response to that, the robot 12 reproduces the reproductive motion information, thereby realizing the interactive actions input by the user.

Reproductive motion information contains not only spontaneous behaviors but also reflex behaviors, and therefore the interactive actions to be performed by the robot 12 include some reflex actions in response to behavior of the person 14. That is, if the person 14 as a communication partner performs an action which meets the precondition for activation of a reflex behavior, toward the robot 12 performing the behavior according to the reproductive motion information, then the robot 12 performs the reflex behavior and presents the person 14 the reactive motion responsive to the action of the person 14. Therefore, the robot 12 can realize more natural and diverse interactive actions or communication actions.

Figure 8:
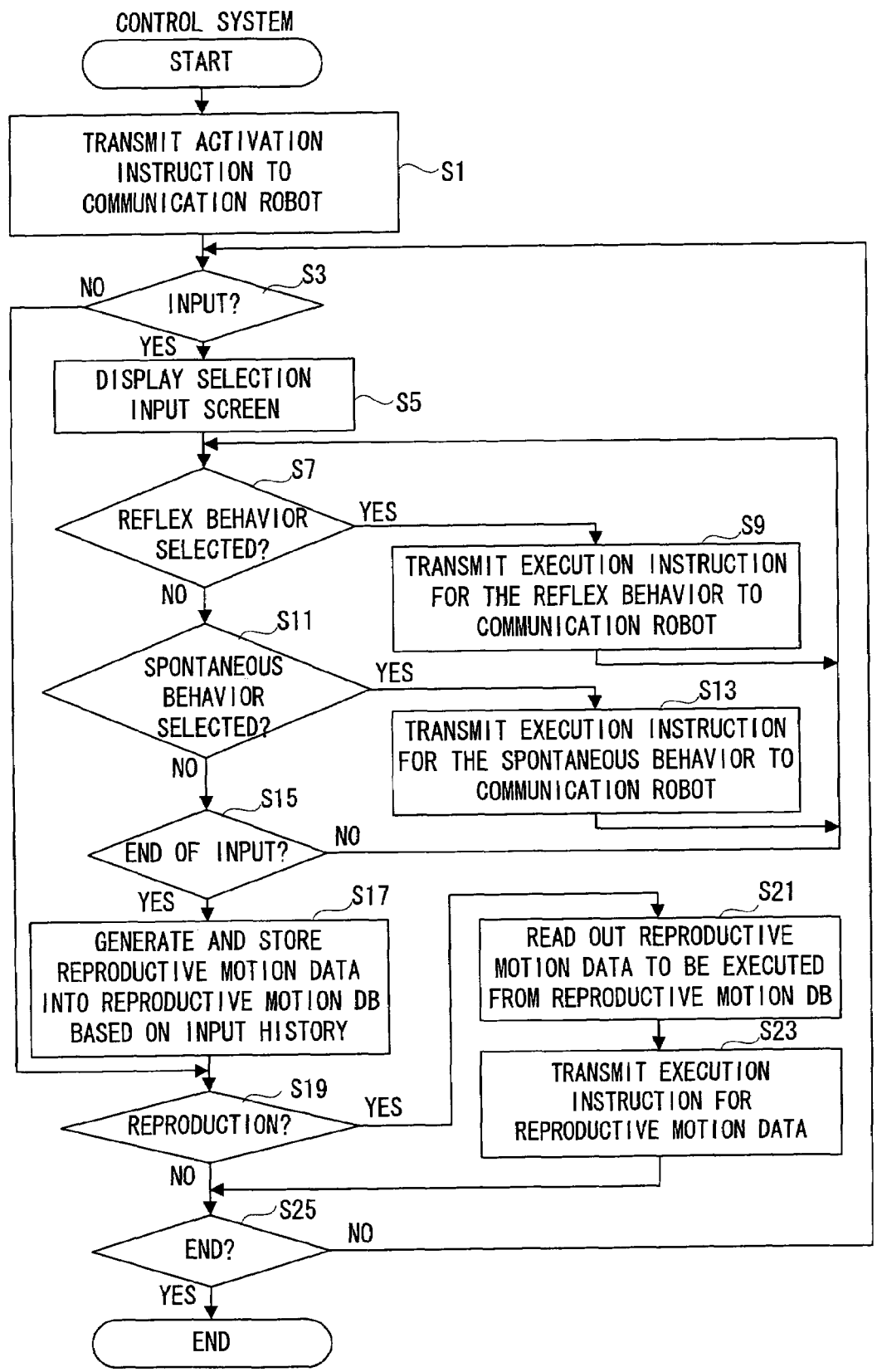
FIG. 8 is a flowchart showing one example of an operation of the control system for communication robot in FIG. 1 embodiment.

FIG. 8 shows one example of an operation of the system 10. The CPU of the system 10 transmits an activation instruction to the robot 12 via a wireless communication apparatus based on the user's operation or the program in a step S1. In the robot 12 a prescribed program is activated according to the activation instruction, and the robot 12 is brought into a state of waiting for instruction data transmitted from the system 10.

Next, it is determined in a step S3 whether or not to input an action. If "YES" in the step S3, that is, if an instruction for input of an action is given by the user's operation of the input apparatus, for example, the selection input screen as shown in FIG. 7 is displayed on the display apparatus in a succeeding step S5.

In the selection input screen, as stated above, a behavior to be performed by the robot 12 is specified in the behavior list section 92 or the direct input section 94 and decided by the decision button 98 according to the user's operation of the input apparatus. The user can repeat the selection/specification and decision of a behavior for creation of a series of interactive actions, and can end action input by operating the input end button 100.

In a step S7, it is determined whether or not any reflex behavior is selected. More specifically, it is determined whether or not the attribute of the decided behavior is reflex behavior, by referring to the behavior list table. If "YES" in the step S7, an execution instruction for the selected reflex behavior is transmitted to the robot 12. The transmitted execution instruction data contains an identifier indicating the selected reflex behavior, for example. In the robot 12, a corresponding reflex behavior processing program is activated according to the execution instruction and the reflex behavior is performed. Additionally, although not illustrated, the decided reflex behavior is temporarily stored in the RAM as input history information. When the step S9 has been completed, the process is returned to the step S7.

On the other hand, if "NO" in the step S7, it is determined in a step S11 whether or not any spontaneous behavior is selected. More specifically, it is determined whether or not the attribute of the decided behavior is spontaneous behavior, by reference to the behavior list table. If "YES" in the step S11, an execution instruction for the selected spontaneous behavior is transmitted to the robot 12 in a succeeding step S13. The transmitted execution instruction data contains an identifier indicating the selected spontaneous behavior, for example. In the robot 12, a corresponding spontaneous behavior processing program is activated according to the execution instruction, and the spontaneous behavior is performed. Additionally, as has been already stated, directly input behaviors are included in the spontaneous behaviors. In case of a directly input behavior, the transmitted execution instruction contains its identifier and input angle data of each of the axes. Besides, although not illustrated, the decided spontaneous behavior is temporarily stored in the RAM as input history information. When the step S13 has been completed, the process is returned to the step S7.

Also, if "NO" in the step S11, it is determined in a step S15 whether the input is ended or not. If "NO" in the step S15, the process is returned to the step S7 to repeat the process. On the other hand, if "YES" in the step S15, that is, if the input end button 100, for example, is operated, reproductive motion data is generated based the input history information and stored in the reproductive motion DB 102 in a succeeding step S17. Although detailed descriptions of the reproductive motion data will be given later. In the reproductive motion data, for example, each of the behaviors is described by its identifier in input order, information on the region and attributes, etc. is contained and, in case of a directly input behavior, the input angle data is contained as well.

If the step S17 is completed or if "NO" in the step S3, it is determined in a step S19 whether or not the behavior is to be reproduced. If "YES" in the step S19, that is, if the reproduction of the behavior is specified by the user's operation of the input apparatus, for example, the reproductive motion data to be executed is read out from the reproductive motion DB 102 in a step S21. A list of reproductive motions stored in the reproductive motion DB 102, for example, is displayed for the user to select the reproductive motion data to be executed. Subsequently, an execution instruction for the read reproductive motion data is transmitted to the robot 12 in a step S23. In response to the execution instruction, the robot 12 reproduces the reproductive motion data and performs a series of communication actions.

If the step S23 is ended or if "NO" in the step S19, it is determined in a step S25 whether or not the end is specified by the user's operation of the input apparatus. If "NO", the process is returned to the step S3. On the contrary, if "YES", the process for input support is terminated.

FIG. 9 shows one example of reproductive motion data generated by the system 10 and stored in the reproductive motion DB 102. Reproductive motion data is like a scenario, and contains not only spontaneous behaviors but reflex behaviors as well. Data of a reproductive motion 1 in FIG. 9 aims to make the robot perform behavior of going up on stage from an audience seat and saying "Hello". In the reproductive motion data, each behavior is described by its identifier in order of execution. Although not illustrated in FIG. 9, information on the region and attribute is included and, in case of the directly input behavior, the input angle data is included as well.

Set in the reproductive motion 1 are actions until reaching the stage, actions on the stage, and actions of leaving from the stage. First of all, the actions until reaching the stage include a behavior of moving along the aisle through the door, a behavior of swinging the arms as if making a march, and a behavior of looking around, which are all spontaneous behaviors. Also, a behavior of saying "Get out of the way, please" when a person comes in front is set as a reflex behavior during the behavior of moving. In addition, a behavior of, when touched by someone, looking at the touched part is set as a reflex behavior during the behavior of swinging the arms as if making a march. Moreover, a behavior of looking toward a person's face, if any, is set as a reflex behavior during the behavior of looking around. The program corresponding to each behavior is repeatedly processed until the robot reaches the stage. Therefore, the robot 12 performs not just spontaneous behaviors such as moving, swinging the arms and looking around but also, in case where a person's specific behavior satisfying the precondition is detected, performs reactive motions, i.e., reflex behaviors in response to the behavior. Next, the actions after arrival to the stage include giving a greeting and bidding farewell. The giving a greeting includes a behavior of saying "Hello" and a gesture of making a bow. The bidding farewell afterward includes a behavior of saying "Bye-bye" and a behavior of waving a hand. They are all spontaneous behaviors. Finally, the actions of leaving the stage include a behavior of moving along the aisle from the stage, a behavior of swinging the arms, and a behavior of looking straight ahead at the exit. They are all spontaneous behaviors. In addition, a behavior of saying "Get out of the way, please" when a person comes in front is set as a reflex behavior during the behavior of moving, a behavior of, when touched by someone, looking at the touched part is set as a reflex behavior during the behavior of swinging the arms as if making a march, and a behavior of looking toward a person's face, if any, is set as a reflex behavior during the behavior of looking straight ahead, as in case with the actions until reaching the stage. The program corresponding to each of the actions of leaving the stage is repeatedly processed until the robot reaches the exit. Additionally, an end instruction is described to end the reproduction of the reproductive motion 1 when the robot finally reaches the position of the exit.

Figure 10:
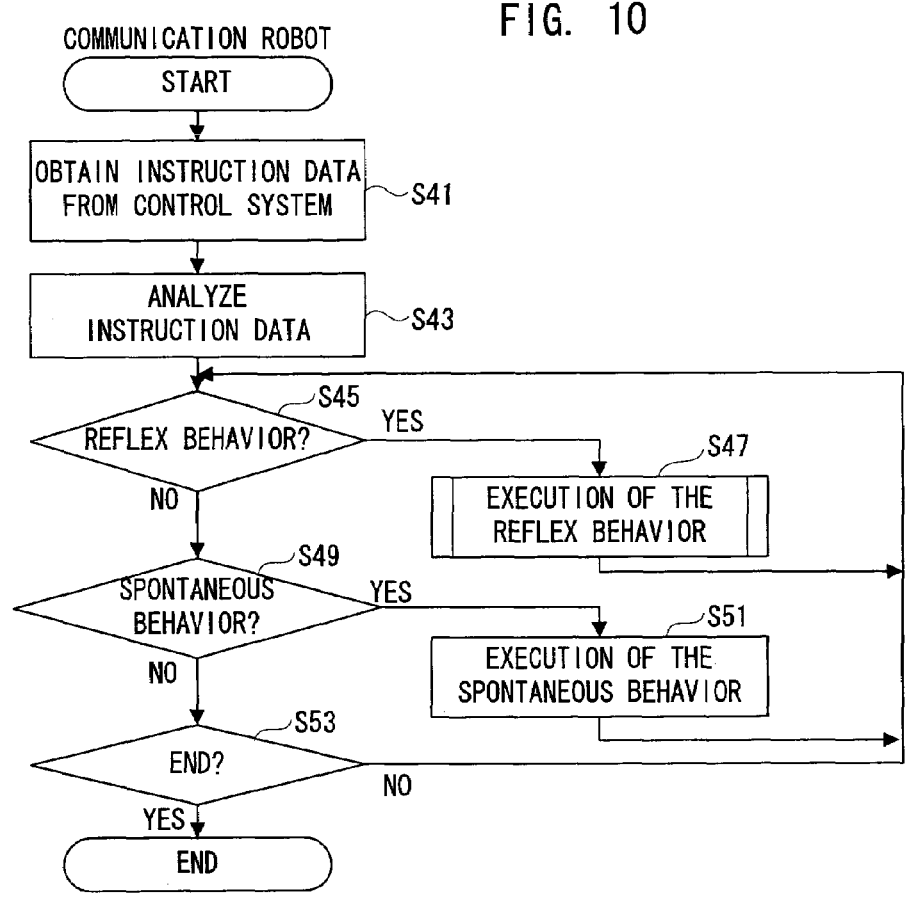
FIG. 10 is a flowchart showing one example of an operation of the communication robot in FIG. 1.

Execution of the action of the robot 12 based on the above described reproductive motion data and the execution instruction for each behavior at a time of action input, is processed in accordance with a flowchart shown in FIG. 10. First of all, the CPU 54 of the robot 12 obtains instruction data transmitted from the system 10 via the wireless communication apparatus 86 and the communication LAN board, in a first step S41 of FIG. 10. Next, the instruction data is analyzed in a step S43. As mentioned above, the instruction data is an execution instruction for reproductive motion data, for example, or an execution instruction for each individual behavior at a time of action input. In case of reproductive motion data, a plurality of behaviors are executed in described order.

Then, it is determined in a step S45 whether or not the behavior to be performed is a reflex behavior based on the attribute information, etc. If "YES", a corresponding reflex behavior program is loaded on the basis of the identifier from the reflex behavior DB 90 into a working area of the memory 58, and the process is executed according to the reflex behavior program. Therefore, if the precondition for performing the reflex behavior is satisfied, the robot 12 performs the reflex behavior and presents the motion toward the person 14 as a communication partner. Upon completion of the process in the step S47, the process is returned to the step S45.

Figure 11:
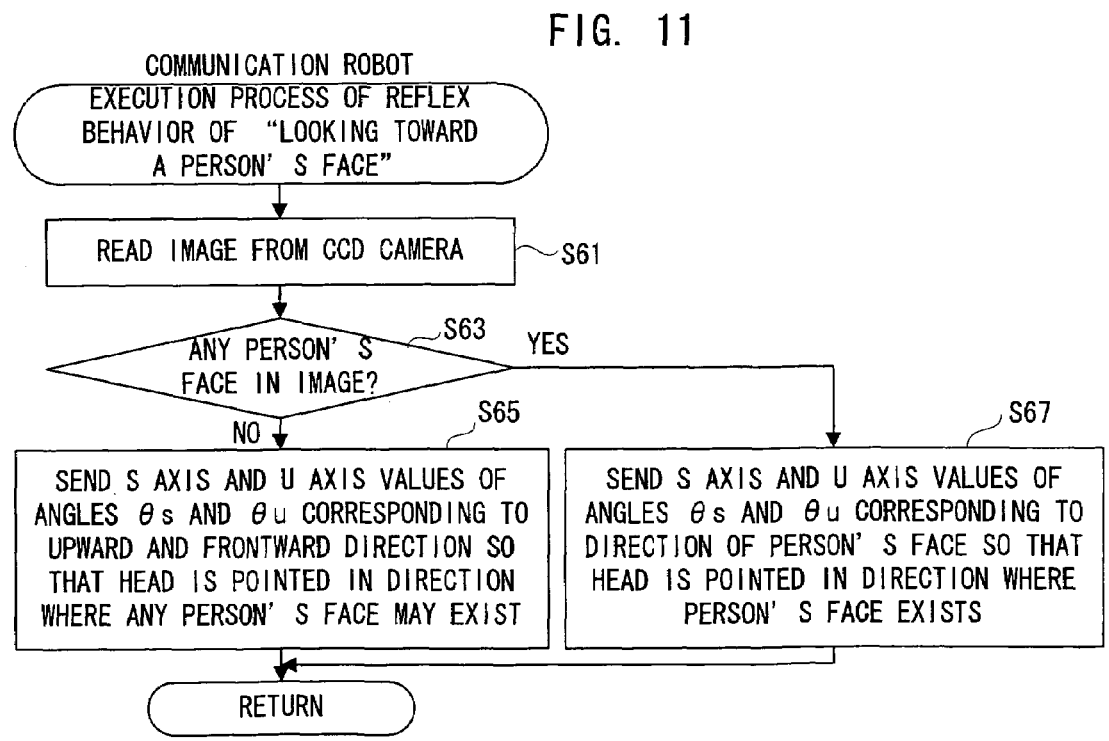
FIG. 11 is a flowchart showing one example of an operation of an action of "looking toward a person's face" out of execution processes of reflex behaviors in FIG. 10.

As one example of the execution process of reflex behavior in the step S47, FIG. 11 shows details on the execution process for a behavior of looking at a person's face. In a first step S61 of FIG. 11, the CPU 54 of the robot 12 reads an image from a CCD camera (the eye camera 52), and determines in a step S63 whether or not there exists any person's face in the image. If "NO" in the step S63, that is, if it is determined that there is no person's face in the obtained image, values of preset angles θs and θu that correspond to an upward and frontward direction are sent as angle control data for the S axis and U axis to the motor control board 60 in a step S65, which controls a head motor 70 of the S axis and U axis to point the head 46 in a direction in which any person's face may exist. On the other hand, if "YES" in the step S63, that is, if any person's face is detected in the obtained image, the values of the angles θs and θu corresponding to the direction of the detected person's face are calculated and the calculated values of the angles θs and θu are sent as angle control data for the S axis and U axis to the motor control board 60 in a step S67, which controls the head motor 70 of the S axis and U axis to point the head 46 in the direction in which the person's face exists. After completion of the process in the step S65 or the step S67, the execution process for the reflex behavior is ended, and the process is returned to the step S45 in FIG. 10 in this case.

On the contrary, if "NO" in the step S45, it is determined in a step S49 whether or not the behavior to be performed is a spontaneous behavior based on the attribute information, etc. If "YES" in the step S49, a corresponding spontaneous behavior program is loaded on the basis of the identifier from the spontaneous behavior DB 88 into a working area of the memory 58, and the process is executed according to the spontaneous behavior program in a step S51. Additionally, in case of the directly input behavior, the process is based on the direct input execution processing program, the input angle data, etc. Therefore, the robot 12 performs the spontaneous behavior and presents the motion toward the person 14 as a communication partner. Upon completion of the process in the step S51, the process is returned to the step S45.

On the other hand, if "NO" in the step S49, it is determined in a step S53 whether or not this is an end instruction. If "NO" in the step S53, the process is returned to the step 45. If "YES", all the behaviors to be performed have been performed and thus the process is terminated.

According to this embodiment, the list of a plurality of behaviors including reflex behaviors responsive to behavior of a person is displayed so that the user can make a selection. This makes it easy to input each behavior forming interactive actions, and also input and generate the interactive actions of the robot 12. Since the generated interactive actions includes not only spontaneous behaviors but also reflex behaviors (reactive motions), if a person exhibits specific behavior during the reproduction, it is possible to activate a reflex behavior responsive to that, which allows the robot 12 to easily realize more natural and diverse interactive actions.

Besides, although the behavior list is displayed in text form in the above described embodiments, it may be possible to present the list using icons of designs indicating characteristics of the behaviors, etc.

In addition, in each of the above stated embodiments, the interactive actions are reproduced by transmitting the reproductive motion data from the system 10 to the robot 12. Alternatively, it may be possible to register in advance the reproductive motion data generated by the system 10 in the reproductive motion DB provided within the robot 12 so as to make the robot 12 perform the interactive actions by the reproductive motion data.

Moreover, each of the above stated embodiments is supposed to support the input of interactive actions including reflex behaviors responsive to a person's behavior. In another embodiment described below, however, it is possible to support the input of emotional interactive actions including some emotional expressions.

Figures 12, 13:
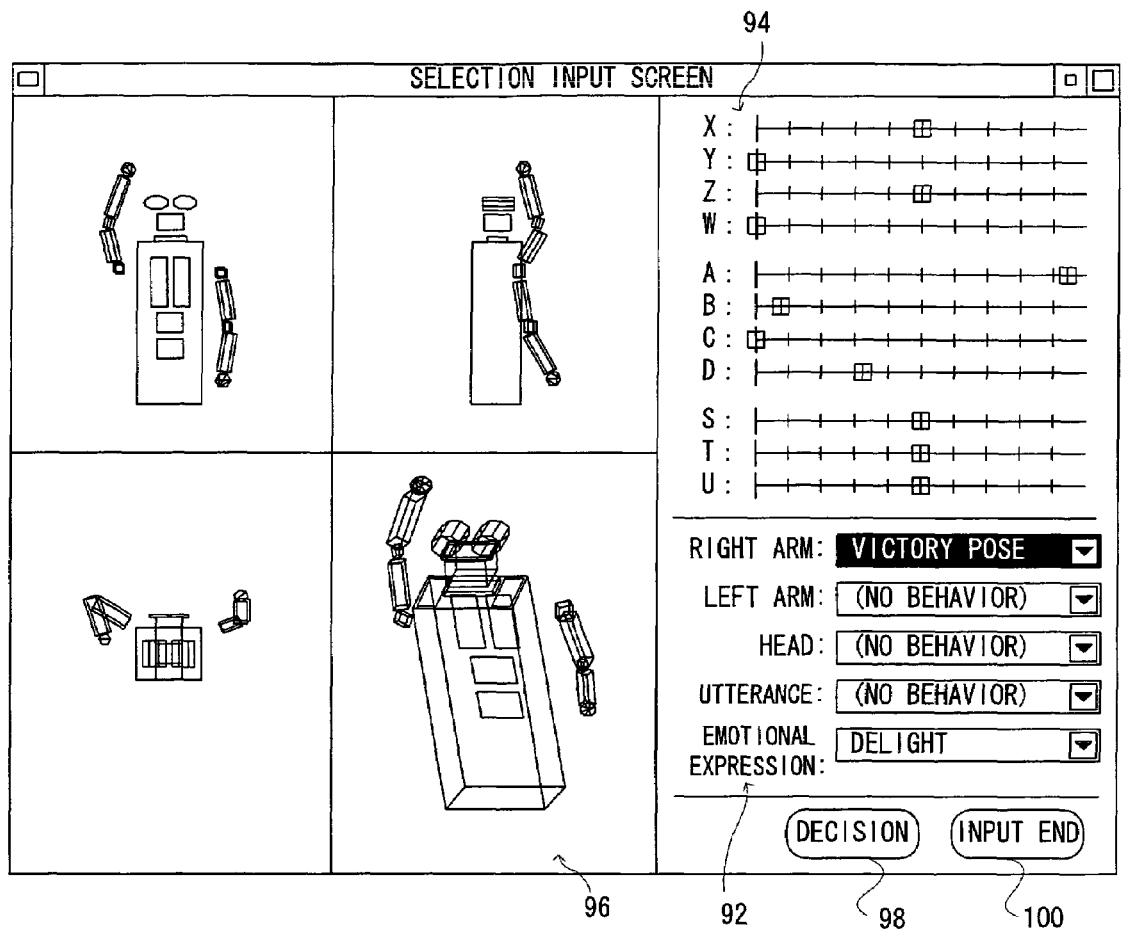
FIG. 12 is an illustrative view showing one example of a selection input screen displayed on a display apparatus of a control system for communication robot in another embodiment.
FIG. 13 is an illustrative view showing one example of contents of emotional expression list data stored in a memory of the control system for communication robot in FIG. 12 embodiment.

FIG. 12 shows one example of the selection input screen displayed on the display apparatus of the system 10 of the other embodiment. The selection input screen displays emotional expressions to be added to the behavior of the robot 12 in a selectable manner. More specifically, the behavior list section 92 is provided with a list box for selecting an emotional expression, for example. The list box for emotional expressions provides a plurality of emotional expressions in text form or the like as option items based on an emotional expression list (FIG. 13).

The storage apparatus including the HDD of the system 10 stores emotional expression list data as shown in FIG. 13 as well as the behavior list data. Registered in the emotional expression list data is information regarding a plurality of emotional expressions to be added to the behavior of the robot 12 in association with the identifiers. For the emotional expressions, basic emotions are prepared such as delight, sadness, anger, fear, disgust and curiosity, for example, and also an option "nothing" is prepared in which no emotional expression is added.

By operating the input apparatus such as a mouse and selecting/specifying one emotional expression in the selection input screen as shown in FIG. 12, the user can select the emotional expression which is to be added to the behavior to be performed by the robot 12. In this manner, listing and displaying a plurality of emotional expressions makes it possible to offer the user the plurality of emotional expressions in an easy-to-understand manner. This allows the user to easily input a desired emotional behavior.

Additionally, the emotional expressions to be prepared are not limited to the above mentioned examples and may be further extended in emotional representation. Regarding facial expressions, for example, the six basic expressions defined by Ekman, that is, happiness, anger, surprise, sadness, fear, and disgust are well known. Also, following expressions are named in "The Managed Heart: Commercialization of Human Feeling" (written by A. R. Hochschild, translated by Jun Ishikawa and Aki Murofushi, Sekaishisosha Co., Ltd., 2000): loneliness, nostalgia, depression, frustration, anger, fear, indignation, disgust, contempt, guilt feeling, anguish, envy, jealousy, affection, sympathy, compassion, embarrassment, sense of shame, anxiety etc.

Also, FIG. 14 shows one example of contents of the behavior list table of this embodiment. Further registered in the behavior list of this embodiment is information for determining whether or not to, in association with the identifier of each behavior, add any emotional expression to the behavior. In this embodiment, information indicating emotional expressions that are prohibited to be added to the behavior, that is, emotional expressions inappropriate for the behavior, is also registered. The information is provided in order to prevent a contradiction between an original emotional expression inherent in a behavior or motion and an emotional expression added by the user.

For example, a behavior of crying should be performed with sorrow, and it is inconsistent to add an expression of "delight" to the behavior of "crying". Therefore, "delight" is registered as an emotion prohibited for the behavior of "crying". Also, a victory pose (raising a fist) is supposed to be made with joy, and it makes no sense to add an expression of "sadness" or "anger" to the behavior of "making a victory pose". Accordingly, "sadness" and "anger" are registered as emotions prohibited for the behavior of "making a victory pose". Meanwhile, as for the behaviors having no problem with any emotional expression, including a behavior of "walking with a swing of the arms", a behavior of "shaking hands", a behavior of "giving a greeting", a behavior of "agreeing" or a behavior of "making a bow", information indicating no inappropriate emotional expression is registered.

Besides, the prohibited emotions are supposed to be registered in an example of FIG. 14. Alternatively, it may be possible to register in the behavior list the information indicating emotional expressions permitted to be added to the behavior.

In the system 10, when some emotional expression is being selected by the user, it is determined whether or not the emotional expression can be added to the selected behavior based on the information indicating the prohibited emotional expressions. If it is determined that the selected emotional expression is not appropriate to the selected action, the addition of the emotional expression to the behavior is not permitted, and the user's selection of emotional expression is reset and the user is prompted to reselect an emotional expression.

Meanwhile, the robot 12 further comprises an emotional expression behavior database (DB) 104 for execution of an emotional behavior. The emotional expression behavior DB 104 is provided with an emotional expression behavior processing program storage area as shown in FIG. 15 in which a plurality of programs for making the robot 12 perform an emotional expression behavior are registered in advance. These stored programs are broadly divided into programs for performing emotional reactive motions and programs for performing emotion correction/conversion.

More specifically, the stored emotional reflex behavior processing programs includes a program for a behavior of agreeing willingly, a program for a behavior of agreeing unwillingly, a program for a behavior of getting scared, etc. In the behavior of "agreeing willingly", the robot 12 utters same word(s) as those said by the object of agreeing, i.e., the communication partner, at a pitch harmonized with the partner's, and nods the head. The tuning of a pitch here means that the pitch varies in a same strain. For example, if the person 14 as a communication partner says "Let's have fun ↑" with a rising tone, the robot 12 also says "Let's have fun ↑" with a rising tone. On the contrary, in the behavior of "agreeing unwillingly", the robot 12 utters same word(s) as those said by the communication partner at a low pitch not turned with the partner's, and nods the head. By not tuning the pitch, an opposite nuance is produced and reluctance is expressed. If the person 14 says "Let's have fun ↑" with a rising tone, the robot 12 says "Let's have fun ↓" with a descending tone. Additionally, in the behavior of "getting scared", the robot 12 turns its eyes away from the object.

In this manner, each of the emotional reactive motions in this embodiment is executed by each program (emotional reflex behavior processing program) prepared in advance for execution of a behavior involving an emotional expression. In order to associate reflex behaviors and emotional expressions to be separately selected in the selection input screen of the system 10 with the emotional reflex behavior processing programs, the memory 58 of the robot 12 stores a list of emotional reflex behaviors as shown in FIG. 16. In the list data, with respect to each of the emotional reflex behaviors, information indicating the reflex behavior (without emotional expression) and emotional expression is stored in association with the identifier of the emotional reflex behavior. Each of the identifiers of the emotional reflex behaviors is associated with each of the emotional reflex behavior processing programs stored in the emotional expression behavior DB 104. Also, the information indicating the reflex behavior is an identifier in the behavior list (FIG. 14), for example, and the information indicating the emotional expression is an identifier in the emotional expression list (FIG. 13), for example. Therefore, the emotional reflex behavior selected by the user can be identified on the basis of the emotional reflex behavior list.

Returning to FIG. 15, the emotional expression action DB 104 stores programs for addition of emotional expressions to the behaviors other than the behaviors prepared as emotional reflex behavior processing programs, that is, the emotion correction/conversion programs. More specifically, the programs for addition of emotional expressions such as delight, sadness and anger, are stored. Each of the emotion correction/conversion programs is associated with each of the identifiers in the emotional expression list (FIG. 13). For addition of an emotional expression, the emotion correction/conversion program coverts control data for realization of a behavior into control data in accordance with the emotional expression. More specifically, in case of a behavior involving a gesture, the angle control data of each axis motor of the robot 12 is converted. Also, in case of a behavior involving utterance, the voice control data for control of a pitch of voice to be output and speaking speed, etc. is converted.

More specifically, in the correction/conversion of "delight", the angle control data of each axis is converted in such a manner that the motion becomes larger (about 1.5 times, for example), and the voice control data is converted in such a manner that the pitch of voice is made higher. Also, in the correction/conversion of "sadness", the angle control data of each axis is converted in such a manner that the motion becomes smaller (about 0.8 time, for example) and the head 46 is directed downward (−15 degrees, for example), and the voice control data is converted in such a manner that the pitch of voice is made lower. Additionally, in the correction/conversion of "anger", the angle control data of each axis is converted in such a manner that the motion becomes more rapid, and the voice control data is converted so that the pitch of voice is made lower and the speaking speed becomes higher.

Based on the control data converted in this manner, each axis motor is driven or the voice modified in pitch and speaking speed, etc. is output from the speaker 48, which realizes the behavior with the emotional expression added.

For example, if delight is added to the behavior of "giving a greeting", the robot 12 says "Hello (at a high pitch)" and makes a bow livelily (with a large gesture). In case where sadness is added, the robot 12 says "Hello (at a low pitch)" and makes a small bow while looking down. If anger is added, the robot 12 says "Hello (at a low pitch and in a rapid manner)" and makes a quick bow. Additionally, if delight is added to the behavior of "walking with a swing of the arms", the robot 12 walks with a large swing of its arms. In case where sadness is added, the robot 12 walks with a small swing of its arms and its head down. In case where anger is added, the robot 12 walks swinging its arms at a high speed. Moreover, if delight is added to the behavior of "shaking hands", the robot 12 says "Let's shake hands (at a high pitch)" and offers its hand in a large way. If sadness is added, the robot 12 says "Let's shake hands (at a low pitch)" and offers its hand in a small way with its head down. In case where anger is added, the robot 12 says "Let's shake hands (at a low pitch and in a rapid manner)" and offers its hand quickly.

In this manner, by subjecting each emotional expression to the emotion correction/conversion, the control data corresponding to the emotional expression is generated for realization of an emotional behavior. This makes it possible to save the trouble to prepare an individual program in which each emotional expression is incorporated in advance with respect to each behavior. Also, it is possible to minimize a capacity of the emotional expression behavior DB 104.

Figure 17:
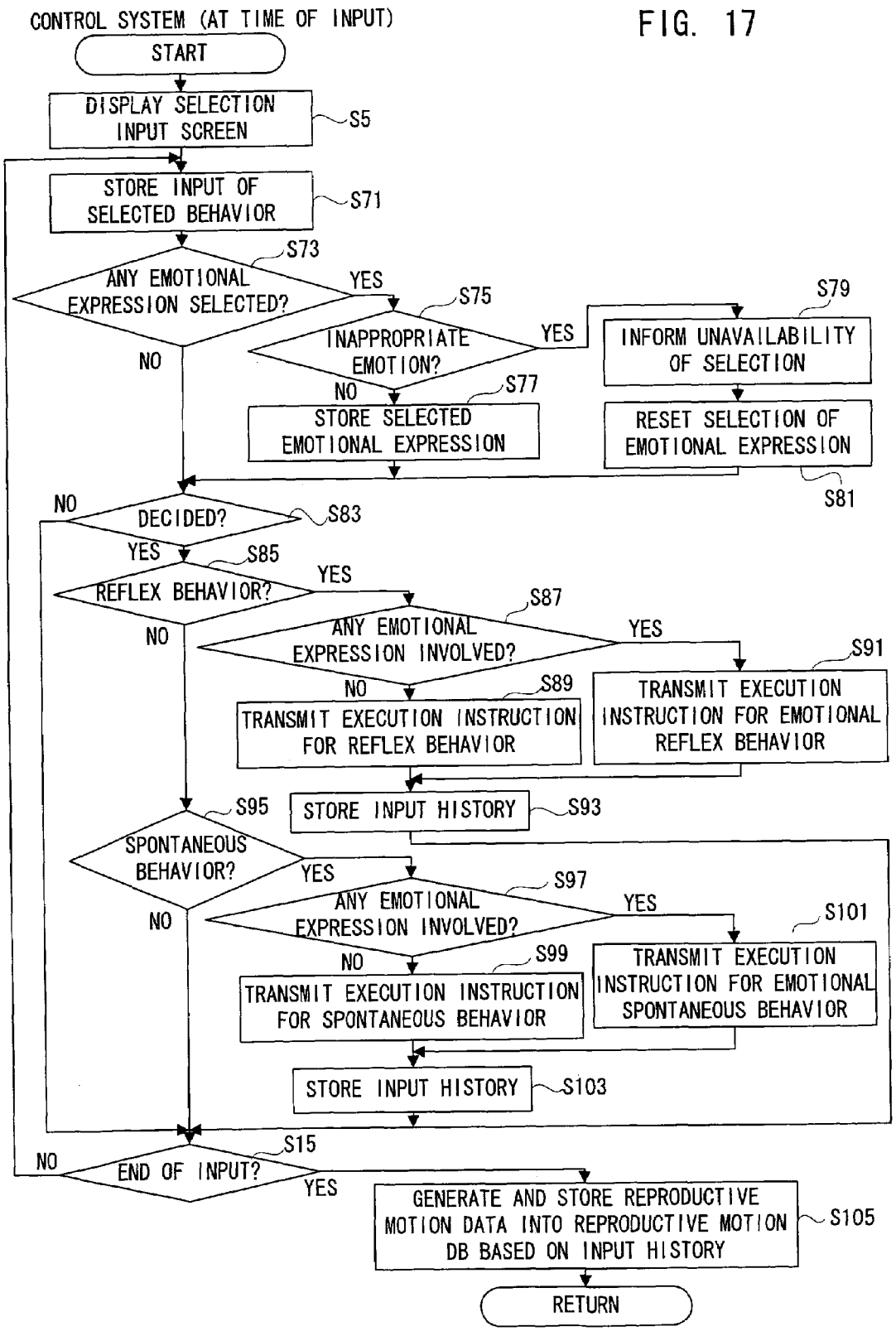
FIG. 17 is a flowchart showing one example of an operation at a time of input of the control system for communication robot in FIG. 12 embodiment.

FIG. 17 shows one example of an operation of the system 10 at a time of action input. When the user provides an instruction for action input, the CPU of the system 10 displays the selection input screen as shown in FIG. 12 on the display apparatus in a first step S5 of FIG. 17.

In addition, the process in the step S5 of FIG. 17 is the same as that in the step S5 of FIG. 8 stated above, and thus is given same reference numerals. Besides, regarding each of following flowcharts, same reference numerals are given in same process as those of the above stated flowcharts so as to omit overlapping detailed descriptions.

Next, according to the user's operation input, data on the behavior selected/input by the user is stored in a prescribed area of the RAM in a step S71. For example, with respect to each of the regions, right arm, left arm, head and utterance, for example, the identifier of each of the behaviors selected/specified by the user is stored, and in case of direct input, angle data is stored as well.

In a step S73, it is determined whether or not any emotional expression is selected. If "YES" in the step S73, it is determined in a step S75 whether or not the selected emotional expression is an emotional expression inappropriate to the selected behavior, based on the behavior list data (FIG. 14). If "NO" in the step S75, that is, if the selected emotional expression is not registered in the behavior list data as an emotional expression prohibited for the selected behavior, for example, it is possible to add the emotional expression to the behavior. Thus, the identifier of the selected emotional expression is stored as input data in a prescribed area of the RAM in a step S77.

On the other hand, if "YES" in the step S75, it is informed by text display or sound output that the emotional expression the user is attempting to select cannot be chosen with respect to the selected behavior. Then, in a step S 81, the user's selection of emotional expression is reset and the emotional expression selection section in the selection input screen is returned to default (no emotional expression, etc.), for example. In this manner, the user is informed that the selection of the emotional expression is not appropriate to the selected behavior, and prompted to select another emotional expression.

If "NO" in the step S73, or when the step S77 or the step S81 has been completed, it is determined in a step S83 whether or not any behavior to be performed by the robot 12 is decided according to the user's operation. If "YES" in the step S83, that is, if the decision button 98 is operated, it is determined in a succeeding step S85 whether or not the selected and decided behavior is a reflex behavior, based on the behavior list data.

If "YES" in the step S85, that is, if the attribute of the behavior is reflex behavior, it is determined in a step S87 whether or not the behavior is accompanied with any emotional expression. If "NO" in the step S87, that is, if the identifier indicative of no emotional expression is stored as information on the selected emotional expression in a prescribed area of the RAM, an execution instruction for the selected and decided reflex behavior is transmitted to the robot 12 in a step S89. For example, transmitted is instruction data including the identifier indicative of the reflex behavior, information on the attribute and region related to the behavior, and the identifier indicative of no emotional expression, etc. Additionally, according to the execution instruction, the corresponding processing program for the reflex behavior is activated in the robot 12.

On the other hand, if "YES" in the step S87, that is, if the identifier indicative of any emotional expression is stored as information on the selected emotional expression in a prescribed area of the RAM, an execution instruction for the selected and decided emotional reflex behavior is transmitted to the robot 12 in a step S91. For example, transmitted is instruction data including the identifier indicative of the reflex behavior, information on the attribute and region related to the behavior, and the identifier indicative of the emotional expression, etc. Additionally, according to the execution instruction, the corresponding processing program for the emotional reflex behavior is activated in the robot 12.

Subsequently, an input history is stored in a prescribed area of the RAM in a step S93. More specifically, the identifier of the decided reflex behavior, the information on the attribute and region related to the behavior, and the identifier of the emotional expression, are recorded as an input history.

On the other hand, if "NO" in the step S85, it is determined in a step S95 whether or not the selected and decided behavior is a spontaneous behavior based on the behavior list data. If "YES" in the step S95, that is, if the attribute of the behavior is spontaneous behavior, it is determined in a step S97 whether or not the behavior is accompanied with any emotional expression. If "NO" in the step S97, an execution instruction for the selected and decided spontaneous behavior is transmitted to the robot 12 in a step S99. For example, transmitted is the instruction data including the identifier indicative of the spontaneous behavior, the information on the attribute and region related to the behavior, the identifier indicative of no emotional expression, and the input angle data (in case of direct input), etc., for example. In addition, according to the execution instruction, the corresponding processing program for the spontaneous behavior is activated in the robot 12.

On the other hand, if "YES" in the step S97, an execution instruction for the emotional spontaneous behavior is transmitted to the robot 12 in a step S101. For example, transmitted is the instruction data including the identifier indicative of the spontaneous behavior, the information on the attribute and region related to the behavior, the identifier indicative of the emotional expression, and the input angle data (in case of direct input), etc. Additionally, according to the execution instruction, the corresponding emotion correction/conversion program and spontaneous behavior processing program are activated in the robot 12.

Subsequently, the input history is stored in a prescribed area of the RAM in a step S103. More specifically, the identifier of the decided spontaneous behavior, the information on the attribute and region related to the behavior, the identifier of the emotional expression, the input angle data (in case of direct input), etc. are recorded as the input history.

Besides, upon completion of the step S93 or the step S103, the process moves to the step S15. Also, if "NO" in the step S95 or if "NO" in the step S83, the process goes on to the step S15 as well.

In the step S15, it is determined whether or not the input end button 100 is operated. If "NO", the process returns to the step S71 to repeat the process for a next behavior input. On the other hand, if "YES" in the step S15, reproductive motion data is generated on the basis of the input history information stored in a prescribed area of the RAM, and stored in the reproductive motion DB 102.

The reproductive motion data generated in this embodiment is the same as that in the above described embodiment, and further includes information (identifier) on the emotional expression of each behavior. FIG. 18 shows one example of reproductive motion data N including some emotional expression stored in the reproductive motion DB 102. This scenario is intended to perform a behavior of making a greeting and shaking hands, for example. Firstly, making a greeting is set and no emotional expression is set. In the behavior of making a greeting, the robot 12 says "Hello" and makes a bow. Also, an eye contact with no emotional expression is set as a reflex behavior. Next, shaking hands is set and delight is set as an emotional expression. In the behavior of shaking hands with delight added, the robot 12 says "Let's shake hands (at a high pitch)" and offers its hand in a big way as described above. Moreover, agreeing is set as a reflex behavior and delight is set as an emotional expression. In the behavior of agreeing with delight added, if some word(s) are uttered by the object of agreeing, the robot 12 utters same word(s) at a harmonized pitch and nods its head, as described later. Also, an end instruction for ending reproduction of this scenario is finally described.

FIG. 19 shows one example of an operation of the system 10 at a time of reproduction. If an instruction for reproduction of the scenario is given by the user's operation, the CPU of the system 10 displays on the display apparatus a list of reproductive motions stored in the reproductive motion DB 102 in a first step S111 of FIG. 19. Subsequently, the selected reproductive motion data is read out from the reproductive motion DB 102 according to the user's operation in a step S113. Then, in a step S23, an execution instruction for the read reproductive motion data is transmitted to the robot 12. In addition, the robot 12 reproduces the reproductive motion data according to the execution instruction, and performs a series of communication actions including reflex motions and emotional expressions.

Figure 20:
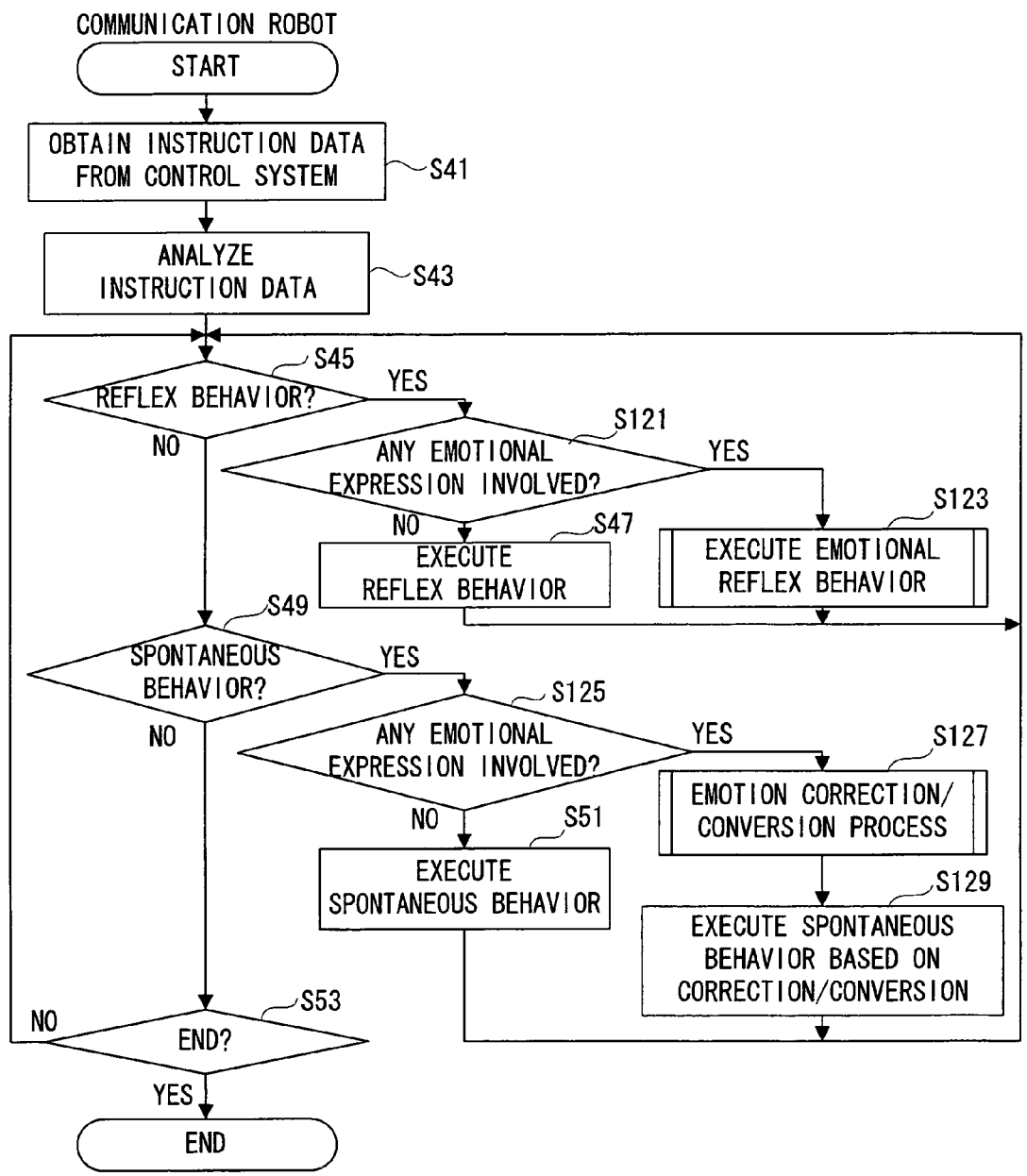
FIG. 20 is a flowchart showing one example of an operation of the communication robot in FIG. 12 embodiment.

FIG. 20 shows one example of an operation of the robot 12. The CPU 54 of the robot 12 obtains instruction data from the system 10 in a step S41, and analyzes the instruction data in a step S43. Then, it is determined in a step S45 whether or not the behavior to be performed is a reflex behavior.

If "YES" in the step S45, it is determined in a step S121 whether or not the behavior involves any emotional expression. The instruction data transmitted from the system 10 contains information (identifier) on emotional expression related to the behavior to be performed, and thus the determination is made on the basis of the information. If "NO" in the step S121, that is, if the identifier indicating no emotional expression is described with respect to the behavior, the corresponding processing program for the reflex behavior is read out from the reflex behavior DB 90 based on the identifier of the reflex behavior, and the process is executed according to the read program in a succeeding step S47. Upon completion of the step S47, the process is returned to the step S45.

On the other hand, if "YES" in the step S121, that is, if an identifier indicating any emotional expression is described with respect to the behavior, for example, the corresponding processing program for the emotional reflex behavior is read out from the emotional expression behavior DB 104 and the process is executed according to the read program in a step S123. The instruction data contains the identifier of the reflex behavior and the identifier of the emotional expression, and thus the processing program for the emotional reflex behavior to be performed is identified on the basis of the list data (FIG. 16) of the emotional reflex behaviors stored in the memory 58 or the emotional expression behavior DB 104. Therefore, in case where the precondition for performing the emotional reflex behavior is satisfied, the robot 12 performs the behavior and offers the emotional reflex motion to the person 14 as a communication partner. Upon completion of the step S123, the process is returned to the step S45.

Figure 21:
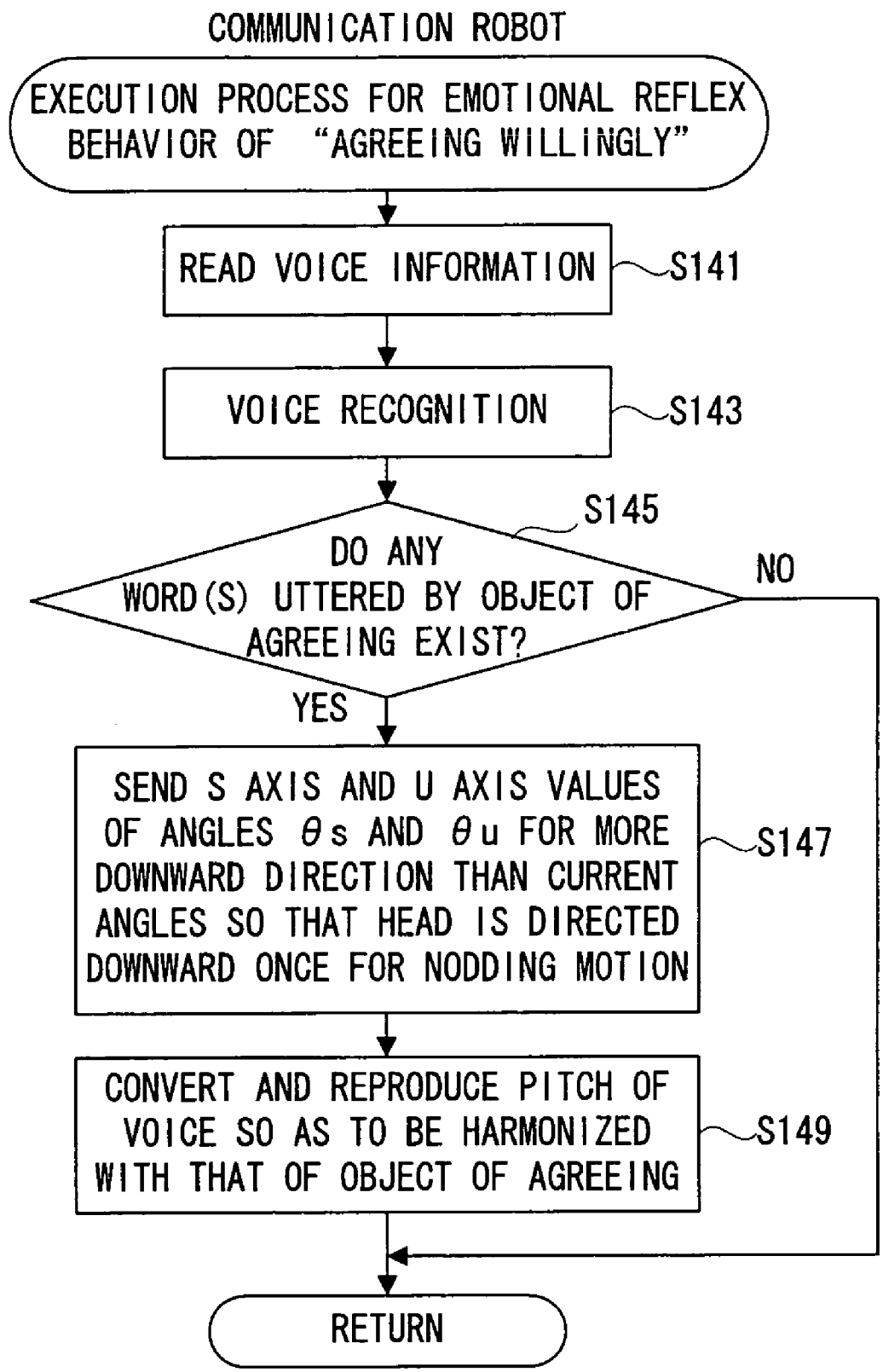
FIG. 21 is a flowchart showing one example of an operation of a behavior of "agreeing willingly" out of execution processes of emotional reflex behaviors in FIG. 20.

As an example of the execution process for the emotional reflex behavior in the step S123, FIG. 21 shows details on the execution process of the behavior of "agreeing willingly". In a first step S141 of FIG. 21, the CPU 54 of the robot 12 reads voice information into the memory 58 via the microphone 32 and the voice input/output board 64. This acquisition of voice information from the communication partner is repeatedly carried out until a prescribed time has elapsed, for example.

Next, the read voice information is subjected to voice recognition in a step S143. The robot 12 is equipped with a voice recognition capability, and the memory 58 stores a dictionary (dictionary for voice recognition) for recognizing word(s) (voice) uttered by the communication partner. Sound data in the dictionary for voice recognition and the obtained voice information are compared by a publicly known method, for example, DP matching or HMM (Hidden Markov Model) to identify contents (word(s) or phrase(s)) of the utterance from the object of agreeing.

Then, it is determined in a step S145 whether or not the word(s) uttered by the object of agreeing exist in the voice data for utterance in the memory 58. If "NO" in the step 145, that is, if no same word(s) as those uttered by the communication partner are stored, the execution process for the behavior is terminated.

On the other hand, if "YES" in the step S145, the values of the angles θs and θu for pointing in a more downward direction than the current angles are sent to the S axis and the U axis in a step S147. More specifically, the angle control data is provided to the motor control board 60 so as to control the S axis motor and the U axis motor of the head motor 70 and direct the head 46 downward for a nodding motion. Then, a pitch of the same voice as the word(s) uttered by the object of agreeing is converted and reproduced in a manner harmonized with the object of agreeing in a step S149. More specifically, the voice control data is converted in such a manner that the pitch of voice to be output varies in the same strain as the pitch of voice from the object of agreeing, based on the information on the pitch of utterance from the object of agreeing obtained by the voice recognition process in the step S143, for example. Then, the converted voice control data and the voice data of same word(s) are provided to the voice input/output board 64, and the speaker 48 outputs the voice.

Returning to FIG. 20, if "NO" in the step S45, it is determined in the step S49 whether or not the behavior to be performed is a spontaneous behavior. If "YES" in the step S49, it is determined in a step S125 whether or not the behavior is accompanied with any emotional expression. If "NO" in the step S125, that is, if the identifier indicating no emotional expression is described with respect to the behavior, for example, the corresponding processing program for the spontaneous behavior is read out from the spontaneous behavior DB 88 based on the identifier of the spontaneous behavior, and the process is executed according to the read program in a succeeding step S51. Upon completion of the step S51, the process is returned to the step S45.

On the other hand, if "YES" in the step S125, that is, if an identifier indicating any emotional expression is described with respect to the behavior, the emotion correction/conversion process is carried out in a step S1127. In the process of the step S127, the corresponding emotion correction/conversion program is read out from the emotional expression behavior DB 104 based on the identifier of the emotional expression, and the emotion correction/conversion is processed on the basis of the read program. More specifically, the control data for realizing the behavior of the robot 12 is altered according to the selected emotional expression. One example of operation of the emotion correction/conversion process is presented in detail in FIG. 22.

Figure 22:
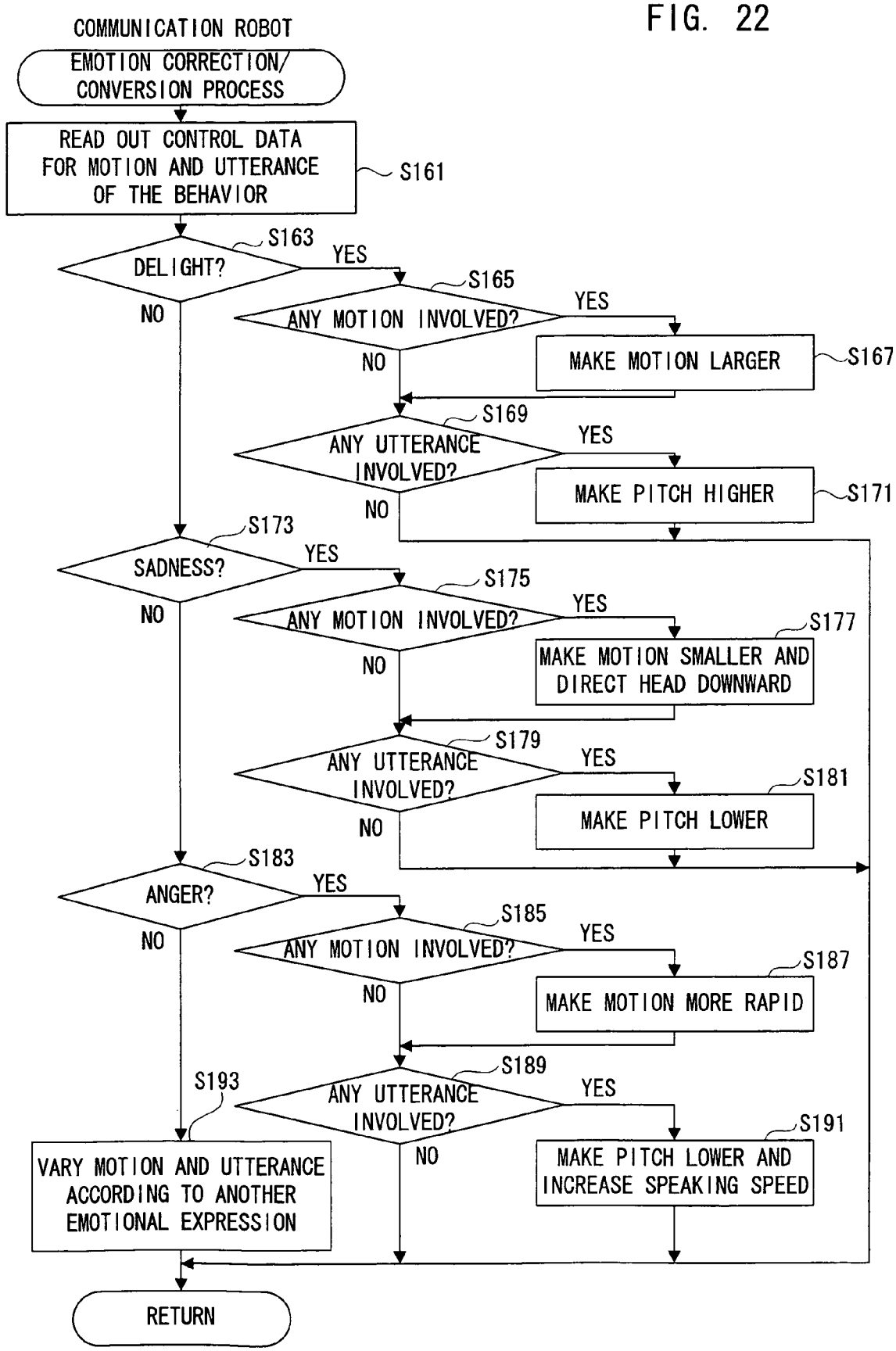
FIG. 22 is a flowchart showing one example of an operation of an emotion correction/conversion process in FIG. 20.

In a first step S161 of FIG. 22, the CPU 54 of the robot 12 reads out the control data of the motion (gesture) of the behavior to be performed and the control data of the utterance into a working area of the memory 58 from a prescribed area of the memory 58 or the spontaneous behavior DB 88. Alternatively, in the case of a direct input behavior, the angle control data directly input by the user, obtained in the step S41, is read out. More specifically, the control data of the motion includes the angle control data of each axis motor, and the control data of the utterance includes voice control data for controlling the pitch of voice to be output and speaking speed, etc.

Next, it is determined in a step S163 whether or not the identifier of the emotional expression is an identifier indicating delight. If "YES" in the step S163, the process is carried out according to the emotion correction/conversion program for delight read out from the emotional expression behavior DB 104. That is, it is determined in a step S165 whether or not the behavior involves any motion based on the angle control data, for example. If "YES" in the step S165, the angle control data of each axis is converted for expression of delight in such a manner to make the motion larger (1.5 times, for example) in a step S167.

Upon completion of the step S167, or if "NO" in the step S165, it is determined in a step S169 whether or not the behavior involves any utterance based on the voice control data, for example. If "YES" in the step S169, the voice control data is converted for expression of delight in such a manner that the pitch of voice to be output is made higher. Upon completion of the step S171, or if "NO" in the step S169, the process is returned to the step S129 of FIG. 20.

On the other hand, if "NO" in the step S163, it is determined in a step S173 whether or not the identifier of the emotional expression is an identifier indicating sadness. If "YES" in the step S173, the process is carried out according to the emotion correction/conversion program for sadness read out from the emotional expression behavior DB 104. That is, it is determined in a step S175 whether or not the behavior is accompanied with any motion. If "YES" in the step S1175, the angle control data of each axis is converted for expression of sadness in such a manner so as to make the motion smaller (0.8 time, for example) and direct the head 46 downward (−15 degrees, for example) in a step S177.

Upon completion of the step S177, or if "NO" in the step S175, it is determined in a step S179 whether or not the behavior is accompanied with any utterance. If "YES" in the step S179, the voice control data is converted for expression of sadness in such a manner that the pitch of voice to be output becomes lower. Upon completion of the step S181, or if "NO" in the step S179, the process is returned to the step S129 of FIG. 20.

On the other hand, if "NO" in the step S173, it is determined in a step S183 whether or not the identifier of the emotional expression is an identifier indicating anger. If "YES" in the step S183, the process is executed according to the emotion correction/conversion program for anger read out from the emotional expression behavior DB 104. That is, it is determined in a step S185 whether or not the behavior is accompanied with any motion. If "YES" in the step S185, the angle control data of each axis is converted for expression of anger in such a manner that the motion becomes more rapid.

Upon completion of the step S187, or if "NO" in the step S185, it is determined in a step S189 whether or not the behavior involves any utterance. If "YES" in the step S189, the voice control data is converted for expression of anger in such a manner so as to lower the pitch of voice to be output and increase the speaking speed. Upon completion of the step S191, or if "NO" in the step S189, the process is returned to the step S129 of FIG. 20.

On the contrary, if "NO" in the step S183, as in the above mentioned cases with emotional expressions of delight, sadness and anger, the motion and the utterance are altered according to another emotional expression in a succeeding step S193. That is, the angle control data and the voice control data are converted as necessary to add the emotional expression to the behavior according to the emotion correction/conversion program associated with the identifier of the emotional expression. When the step S193 has been completed, the process is returned to the step S129 of FIG. 20.

Returning to FIG. 20, the emotional spontaneous behavior based on the correction/conversion is executed in the step S129. That is, the process is carried out according to the processing program for the spontaneous behavior associated with the identifier of the spontaneous behavior and the control data corrected/converted in the step S127. This offers the communication partner the spontaneous behavior with the emotional expression added. Upon completion of the step S129, the process is returned to the step S45.

On the other hand, if "NO" in the step S49, it is determined in the step S53 whether or not an end instruction is given. If "NO", the process returns to the step S45. If "YES", all the behavior to be performed has been carried out and the process is terminated.

According to this embodiment, the list of behaviors and also the list of emotional expressions to be added to the behaviors are displayed for the user's selection, which makes it possible to easily input an emotional motion and also easily input and generate emotional interactive actions to be performed by the communication robot. Therefore, the generated interactive actions may include emotional reflex behaviors and emotional spontaneous behaviors, etc., and thus it is possible to easily make the robot 12 realize more diverse interactive actions.

In addition, information indicating inappropriate or appropriate emotional expressions with respect to each behavior is stored so as to determine whether or not the emotional expression the user attempts to select is appropriate, and thus it is possible to avoid a contradiction between the emotional expression inherent in the behavior selected by the user and the additional emotional expression. Therefore, this makes possible to easily input a natural emotional motion and also easily input and generate natural emotional interactive actions.

Besides, in each of the above described embodiments, emotion correction/conversion is carried out by the robot 12 as shown in FIG. 20 and FIG. 22. However, the emotional expression behavior DB 104 (emotion correction/conversion program) may be provided in the system 10 so that the system 10 executes emotion correction/conversion in the case where a behavior involving any emotional expression is selected and decided. In this case, the angle control data and the voice control data are converted as necessary in the step S101 of FIG. 17, and the instruction data including the converted control data is transmitted to the robot 12. Also, in the step S105 of FIG. 17, the reproductive motion data including the information on the behavior and the control data subjected to emotion correction/conversion, etc. is generated and stored in the reproductive motion DB 102.

Moreover, in each of the above discussed embodiments, emotion correction/conversion is executed only on spontaneous behaviors, and reflex behaviors are supposed to be performed by each individual program for performing each behavior in which some emotional expression is incorporated. However, in case of behaviors involving only simple utterance or simple gesture like saying "Get out of the way, please" when a person comes in front, for example, it may be possible to convert the control data by emotion correction/conversion and realize the emotional reflex behavior based on the converted control data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control system for communication robot for supporting input of interactive actions to be performed by a communication robot, comprising:
  a first storage storing in advance information on a plurality of behaviors associated with a plurality of behavior programs including a spontaneous behavior program for performing a spontaneous behavior and a reflex behavior program prepared with inclusion of determination of a precondition and for performing a reflex behavior in response to behavior of a person when the precondition is satisfied;
  a displayer displaying on a display a list of said plurality of behaviors in a user-selectable manner based on said information stored in said first storage;
  a detector detecting a user's operation to an input device to select a behavior to be performed by said communication robot from said list of behaviors displayed by said displayer;
  a behavior decider deciding the behavior to be performed by said communication robot on the basis of a detection result by said detector;
  a second storage storing the behavior decided by said behavior decider as input history information;
  an accumulator accumulating a plurality of input history information stored by said second storage; and
  a generator generating reproductive motion information for interactive actions to be performed by said communication robot on the basis of the plurality of input history information accumulated by said accumulator.

2. A control system for communication robot as set forth in claim 1, wherein
  said displayer further displays a plurality of emotional expression lists in a user-selectable manner on said display;
  said detector detects a user's input operation to decide an emotional expression which is to be added to the behavior to be performed by said communication robot from said emotional expression lists;
  said behavior decider further decides an emotional expression which is to be added to the behavior to be performed by said communication robot on the basis of a detection result by said detector;

said second storage stores the behavior and the emotional expression decided by said behavior decider as input history information; and said generator generates said reproductive motion information on the basis of the plurality of input history information accumulated by said accumulator and emotional expression decided by said behavior decider.

3. A control system for communication robot as set forth in claim 2, wherein said behavior decider further includes a determiner determining whether or not the emotional expression selected by the user is appropriate to the selected behavior, and does not permit said emotional expression to be added to said behavior if said determiner determines that said emotional expression is not appropriate to said behavior.

4. A control system for communication robot as set forth in claim 2, wherein when said emotional expression is added to said behavior, said generator corrects control data for performing the behavior according to the emotional expression and generates reproductive motion information including the corrected control data.

5. A control system for communication robot as set forth in claim 2, further comprising a transmitter, when said behavior decider has decided the behavior to be performed by said communication robot, transmitting an execution instruction for said behavior to said communication robot.

6. A control system for communication robot as set forth in claim 1, further comprising a transmitter, when said behavior decider has decided the behavior to be performed by said communication robot, transmitting an execution instruction for said behavior to said communication robot.

7. A control system for communication robot as set forth in claim 1, wherein said display displays said list of behaviors classified by region of said communication robot.

8. A control system for communication robot as set forth in claim 1, wherein when the behavior is selected from said list of behaviors by the user's operation, said display displays an image of an appearance of said communication robot performing said behavior.

9. A computer-readable storage medium storing a program for supporting input of interactive actions to be performed by a communication robot, on a control system for communication robot comprising a first storage storing in advance information on a plurality of behaviors associated with a plurality of behavior programs including a spontaneous behavior program for performing a spontaneous behavior and a reflex behavior program prepared with inclusion of determination of a precondition and for performing a reflex behavior in response to behavior of a person when the precondition is satisfied, wherein said program causes a processor of said control system for communication robot to execute:

a display step of displaying a list of said plurality of behaviors in a user-selectable manner based on said information stored in said first storage;

a detection step of detecting a user's operation to an input device to select a behavior to be performed by said communication robot from said list of behaviors displayed by said display step;

a behavior decision step of deciding the behavior to be performed by said communication robot on the basis of a detection result by said detection step;

a storage step of storing in a second storage of the control system the behavior decided by said behavior decision step as input history information;

an accumulation step of accumulating a plurality of input history information stored by said storage step; and a generation step of generating reproductive motion information for interactive actions to be performed by said communication robot on the basis of the plurality of input history information accumulated by said accumulation step.

10. A computer-readable storage medium storing a program as set forth in claim 9, wherein said display step further displays a plurality of emotional expression lists in a user-selectable manner;

said detection step detects a user's input operation to decide an emotional expression which is to be added to the behavior to be performed by said communication robot from said emotional expression lists;

said behavior decision step further decides an emotional expression which is to be added to the behavior to be performed by said communication robot on the basis of a detection result by said detection step;

said storage step stores the behavior and the emotional expression decided by said behavior decision step as input history information; and said generation step generates said reproductive motion information on the basis of the plurality of input history information accumulated by said accumulation step and emotional expression decided by said behavior decision step.

11. A computer-readable storage medium storing a program as set forth in claim 10, wherein said behavior decision step further includes a determination step of determining whether or not the emotional expression selected by the user is appropriate to the selected behavior, and does not permit said emotional expression to be added to said behavior if said determination step determines that the emotional expression is not appropriate to the behavior.

12. A computer-readable storage medium storing a program as set forth in claim 10, wherein when said emotional expression is added to said behavior, said generation step corrects control data for performing the behavior according to the emotional expression and generates reproductive motion information including the corrected control data.

13. An action input support method for supporting input of interactive actions to be performed by a communication robot, on a control system for communication robot comprising a first storage storing in advance information on a plurality of behaviors associated with a plurality of behavior programs including a spontaneous behavior program for performing a spontaneous behavior and a reflex behavior program prepared with inclusion of determination of a precondition and for performing a reflex behavior in response to behavior of a person when the precondition is satisfied, including:

a display step of displaying a list of said plurality of behaviors in a user-selectable manner based on said information stored in said first storage means;

a detection step of detecting a user's operation to an input device to select a behavior to be performed by said communication robot from said list of behaviors displayed by said display step;

a behavior decision step of deciding the behavior to be performed by said communication robot on the basis of a detection result by said detection step;

a storage step of storing in a second storage of the control system the behavior decided by said behavior decision step as input history information;

an accumulation step of accumulating a plurality of input history information stored by said storage step; and a generation step of generating reproductive motion information for interactive actions to be performed by said communication robot on the basis of the plurality of input history information accumulated by said accumulation step.

14. An action input support method as set forth in claim 13, wherein said display step further displays a plurality of emotional expression lists in a user-selectable manner;

said detection step detects a user's input operation to decide an emotional expression which is to be added to the behavior to be performed by said communication robot from said emotional expression lists;

said behavior decision step further decides an emotional expression which is to be added to the behavior to be performed by said communication robot on the basis of a detection result by said detection step;

said storage step stores the behavior and the emotional expression decided by said behavior decision step as input history information; and said generation step generates said reproductive motion information on the basis of the plurality of input history information accumulated by said accumulation step and emotional expression decided by said behavior decision step.

15. An action input support method as set forth in claim 14, wherein said behavior decision step further includes a determination step of determining whether or not the emotional expression selected by the user is appropriate to the selected behavior, and does not permit said emotional expression to be added to said behavior if said determination step determines that said emotional expression is not appropriate to said behavior.

16. An action input support method as set forth in claim 14, wherein when said emotional expression is added to said behavior, said generation step corrects control data for performing the behavior according to the emotional expression and generates reproductive motion information including the corrected control data.

\* \* \* \* \*